(12) United States Patent
Ryu

(10) Patent No.: US 7,995,938 B2
(45) Date of Patent: Aug. 9, 2011

(54) TONER AGITATING STEPPING MOTOR CONTROL UNIT, IMAGE FORMING APPARATUS AND STEPPING MOTOR CONTROL METHOD

(75) Inventor: Gunmun Ryu, Osaka (JP)

(73) Assignee: Kyocera Mita Corporation (JP)

( * ) Notice: Subject to any disclaimer, the term of this patent is extended or adjusted under 35 U.S.C. 154(b) by 0 days.

(21) Appl. No.: 12/724,632

(22) Filed: Mar. 16, 2010

(65) Prior Publication Data

US 2010/0239290 A1    Sep. 23, 2010

(30) Foreign Application Priority Data

Mar. 17, 2009 (JP) .................................. 2009-064709

(51) Int. Cl.
G03G 15/00 (2006.01)
G05B 19/40 (2006.01)

(52) U.S. Cl. ............ 399/44; 399/53; 399/256; 318/685; 318/696

(58) Field of Classification Search ............ 399/38, 399/44, 53, 55, 56, 58, 59, 119, 120, 252–256, 399/262, 263; 318/685, 696
See application file for complete search history.

(56) References Cited

U.S. PATENT DOCUMENTS

| | | | | |
|---|---|---|---|---|
| 5,844,394 | A * | 12/1998 | Mushika et al. | 318/696 |
| 6,911,800 | B2 * | 6/2005 | Kobayashi et al. | 318/685 |
| 7,292,800 | B2 * | 11/2007 | Miyazawa et al. | 399/53 |
| 7,880,422 | B2 * | 2/2011 | Tsujimoto et al. | 318/685 |

FOREIGN PATENT DOCUMENTS

| | | | |
|---|---|---|---|
| JP | 6-43793 | * | 2/1994 |
| JP | 2000-172127 | | 6/2000 |
| JP | 2002-148886 | | 5/2002 |

* cited by examiner

*Primary Examiner* — Hoan Tran
(74) *Attorney, Agent, or Firm* — Gerald E. Hespos; Michael J. Porco

(57) ABSTRACT

A control unit is provided with an excitation current output section for outputting an excitation current to a stepping motor, a first level judging section for judging a drive stop time level indicating the duration of a time during which the stepping motor is not driven, a storage storing a plurality of starting torque values required to start driving the stepping motor and a plurality of drive stop time levels while relating them to each other, and a controller for obtaining the starting torque value corresponding to the drive stop time level judged by the first level judging section by referring to the storage, calculating an excitation current value which gives the obtained starting torque value and outputting an excitation current having the calculated excitation current value.

14 Claims, 11 Drawing Sheets

FIG.3A

TORQUE RATIO FOR ONE COLOR HOPPER (M)

| HUMIDITY | TEMPERATURE | DRIVE STOP TIME (AGITATION STOP TIME) | | |
|---|---|---|---|---|
| | | SHORT | MEDIUM | LONG |
| HIGH | HIGH | 1 | 1.5 | 1.5 |
| NORMAL | HIGH | 1 | 1.5 | 1.5 |
| LOW | HIGH | 1 | 1.5 | 1.5 |
| HIGH | NORMAL | 1 | 1.5 | 1.5 |
| NORMAL | NORMAL | 1 | 1 | 1.5 |
| LOW | NORMAL | 1 | 1 | 1.5 |
| HIGH | LOW | 1 | 1 | 1.5 |
| NORMAL | LOW | 1 | 1 | 1.5 |
| LOW | LOW | 1 | 1 | 1.5 |

FIG.3B

TORQUE RATIO FOR ONE COLOR HOPPER (C)

| HUMIDITY | TEMPERATURE | DRIVE STOP TIME (AGITATION STOP TIME) | | |
|---|---|---|---|---|
| | | SHORT | MEDIUM | LONG |
| HIGH | HIGH | 1 | 1.5 | 1.5 |
| NORMAL | HIGH | 1 | 1.5 | 1.5 |
| LOW | HIGH | 1 | 1.5 | 1.5 |
| HIGH | NORMAL | 1 | 1.5 | 1.5 |
| NORMAL | NORMAL | 1 | 1 | 1.5 |
| LOW | NORMAL | 1 | 1 | 1.5 |
| HIGH | LOW | 1 | 1 | 1.5 |
| NORMAL | LOW | 1 | 1 | 1.5 |
| LOW | LOW | 1 | 1 | 1.5 |

FIG.3C

TORQUE RATIO FOR ONE COLOR HOPPER (Y)

| HUMIDITY | TEMPERATURE | DRIVE STOP TIME (AGITATION STOP TIME) | | |
|---|---|---|---|---|
| | | SHORT | MEDIUM | LONG |
| HIGH | HIGH | 1 | 1.5 | 1.5 |
| NORMAL | HIGH | 1 | 1.5 | 1.5 |
| LOW | HIGH | 1 | 1.5 | 1.5 |
| HIGH | NORMAL | 1 | 1.5 | 1.5 |
| NORMAL | NORMAL | 1 | 1 | 1.5 |
| LOW | NORMAL | 1 | 1 | 1.5 |
| HIGH | LOW | 1 | 1 | 1.5 |
| NORMAL | LOW | 1 | 1 | 1.5 |
| LOW | LOW | 1 | 1 | 1.5 |

FIG.3D

TORQUE RATIO FOR ONE COLOR HOPPER (K)

| HUMIDITY | TEMPERATURE | DRIVE STOP TIME (AGITATION STOP TIME) | | |
|---|---|---|---|---|
| | | SHORT | MEDIUM | LONG |
| HIGH | HIGH | 1.5 | 2 | 2 |
| NORMAL | HIGH | 1.5 | 2 | 2 |
| LOW | HIGH | 1.5 | 2 | 2 |
| HIGH | NORMAL | 1.5 | 2 | 2 |
| NORMAL | NORMAL | 1.5 | 1.5 | 2 |
| LOW | NORMAL | 1.5 | 1.5 | 2 |
| HIGH | LOW | 1.5 | 1.5 | 2 |
| NORMAL | LOW | 1.5 | 1.5 | 2 |
| LOW | LOW | 1.5 | 1.5 | 2 |

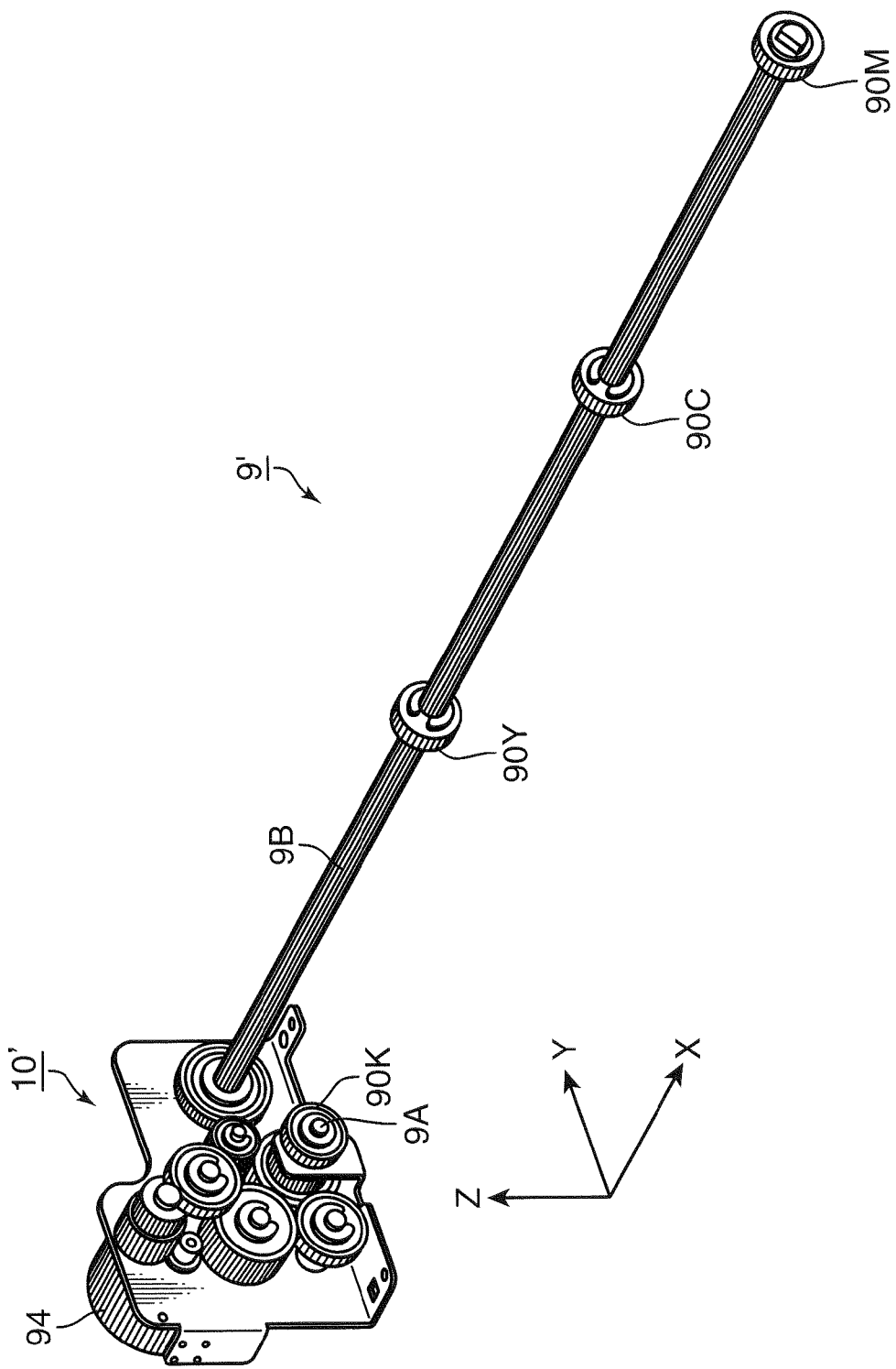

TONER AGITATING STEPPING MOTOR CONTROL UNIT, IMAGE FORMING APPARATUS AND STEPPING MOTOR CONTROL METHOD

BACKGROUND OF THE INVENTION

1. Field of the Invention

The present invention relates to a toner agitating stepping motor control unit, an image forming apparatus and a stepping motor control method.

2. Description of the Related Art

Conventionally, stepping motors having a feature of being inexpensive and small have been widely used. A stepping motor of this type is disposed to generate a rotational force for rotating an agitation paddle for agitating toner contained in a toner hopper, for example, in an image forming apparatus. Since the agitation paddle is rotated by rotational force generation of the stepping motor in this way, adhesion of the toner contained in the topper hopper is prevented.

In the case of disposing the stepping motor for generating a rotational force to rotate the agitation paddle as described above, the following problem occurs. For example, power is wastefully consumed by the stepping motor. The reason for this problem is described below.

Specifically, an unused state of toner continues for a long time if a turned-off state of the image forming apparatus continues for a long time or if a sleep mode for cutting off power supply to a member with large power consumption (e.g. fixing device for fixing a toner image transferred to a recording medium from an image bearing member) in the image forming apparatus.

The toner tends to adhere if the unused state of the toner continues for a long time in this way. Thus, upon starting image formation using the toner having not been used for a long time, the toner in a state of adhesion needs to be agitated and returned to a pulverized state. Upon starting the agitation of the toner in such a state of adhesion, resistance hindering the rotation of the agitation paddle is large.

If the resistance hindering the rotation of the agitation paddle is large as described above, a step out phenomenon occurs in which the stepping motor cannot be rotated step by step unless a sufficiently large torque is generated in the stepping motor. If such a step out phenomenon occurs, the stepping motor vibrates or rotates in a reverse direction. In order to prevent the occurrence of such a step out phenomenon, it is required to generate a sufficiently large torque in the stepping motor. Thus, the value of an excitation current received by the stepping motor is set at a large value.

However, if the value of the excitation current received by the stepping motor is set at the large value in this way, power consumption increases. Since the excitation current value is normally set to a constant value regardless of the state of adhesion of the toner, the excitation current value remains to be set at the large value even in a state of non-adhesion. Therefore, power is wastefully consumed.

An apparatus for suppressing such a waste of power consumption has been conventionally employed.

For example, the following apparatus is known. Specifically, the apparatus activates a plurality of brushless motors in a stationary state by an open loop control, keeps such a state for a fixed time and then discriminates the state of toner by a closed loop control of the plurality of brushless motors. When the toner is in a state of adhesion, the apparatus independently controls the plurality of respective brushless motors in a time-series manner. Since the apparatus independently controls the plurality of respective brushless motors in the time-series manner in this way, starting sequences of the plurality of respective brushless motors do not overlap. Thus, the apparatus can generate large torques from the plurality of respective brushless motors without increasing the sum total of starting currents of the plurality of brushless motors.

There is also known an apparatus in which the value of a rotational current to be output to a rotary motor of a process cartridge is set at a value larger than the value of a rotational current in normal time when at least the detachment of the process cartridge including an agitation member for agitating the toner is detected. According to this apparatus, power consumption is suppressed in normal time.

The former apparatus controls the plurality of respective brushless motors by the open and closed loops. Thus, expensive motors conforming to the closed-loop control (feedback control) are necessary. Further, in this apparatus, a feedback mechanism enabling the closed-loop control of the motors is necessary. Therefore, cost increases.

The latter apparatus increases the value of the rotational current upon detecting the detachment of the process cartridge including the agitation member for agitating the toner. This apparatus cannot deal with a case where the unused state of the toner continues with the process cartridge mounted.

SUMMARY OF THE INVENTION

In order to solve the above problem, an object of the present invention is to provide a toner agitating stepping motor control unit, an image forming apparatus and a stepping motor control method capable of realizing lower cost and suppressing power consumption by generating a large torque in a stepping motor compatible with an open-loop control when there is a possibility of toner adhesion such as when an unused state of the toner continues without performing image formation for a long time.

Specifically, the present invention is directed to a toner agitating stepping motor control unit used in combination with a stepping motor to be driven upon receiving the input of an excitation current compatible with an excitation method for exciting a plurality of excitation coils, comprising an excitation current output section for outputting the excitation current to the stepping motor; a first level judging section for judging a drive stop time level indicating the duration of a time during which the stepping motor is not driven; a storage storing a plurality of starting torque values required to start driving the stepping motor and a plurality of drive stop time levels while relating them to each other; and a controller for obtaining the starting torque value corresponding to the drive stop time level judged by the first level judging section by referring to the storage, calculating an excitation current value which gives the obtained starting torque value and outputting an excitation current having the calculated excitation current value.

These and other objects, features and advantages of the present invention will become more apparent upon the reading of the following detailed description. Further, advantages of the present invention will become more apparent in the following description with reference to accompanying drawings.

BRIEF DESCRIPTION OF THE DRAWINGS

FIG. 10 is a perspective view showing another exemplary agitation paddle rotating mechanism, and FIG. 11 are diagrams showing another exemplary construction of the transmission switching assembly.

DETAILED DESCRIPTION OF THE PREFERRED EMBODIMENTS

Hereinafter, a toner agitating stepping motor control unit and an image forming apparatus according to one embodiment of the present invention are described. The image forming apparatus according to the embodiment of the present invention is an electrophotographic image forming apparatus and, for example, applicable as a printer, a copier, a facsimile machine or a complex machine including these functions.

Figure 1:
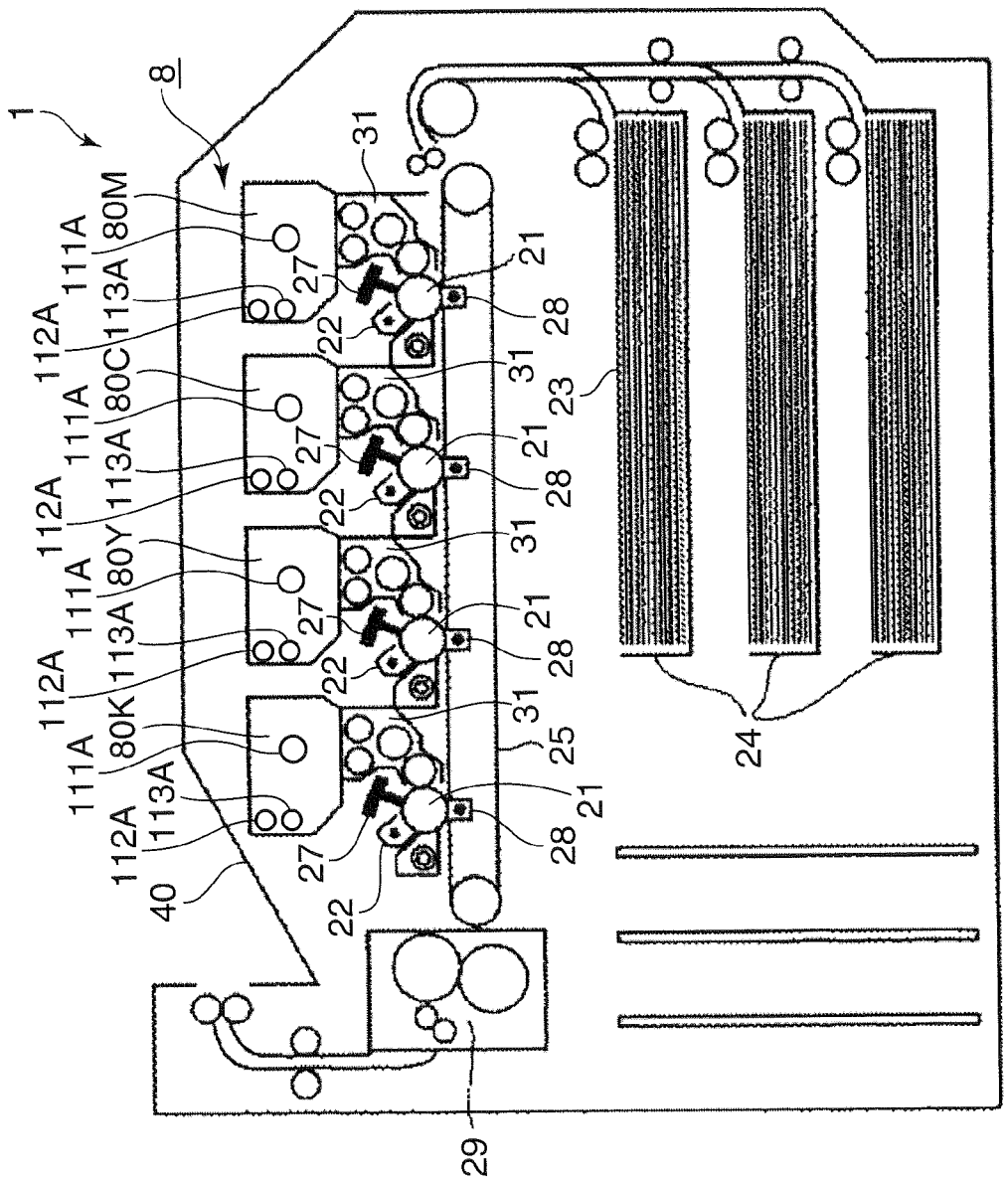
FIG. 1 is a schematic section of an image forming apparatus according to one embodiment of the invention.

FIG. 1 is a schematic section of the image forming apparatus according to the embodiment of the present invention. In FIG. 1, a tandem image forming apparatus 1 is illustrated as the image forming apparatus according to the present invention. However, the image forming apparatus according to the present invention may also be an image forming apparatus using an intermediate transfer belt.

In FIG. 1, the image forming apparatus 1 is provided with photoconductive members 21 capable of bearing an electrostatic latent image by being charged, chargers 22 for charging the photoconductive members 21, exposure units 27 for forming an electrostatic latent image on the photoconductive member 21, developing devices 31 for developing a toner image by supplying toner to the photoconductive member 21 and transfer devices 28 for transferring the toner image formed on the photoconductive member 21 to a conveyed sheet 23.

A toner supply device 8 is detachably mounted in the image forming apparatus 1 to supply toners to the respective developing devices 31. The toner supply device 8 includes a black toner hopper 80K (hereinafter, toner hopper 80K) for containing black toner and supplying it to the corresponding developing device 31 and a yellow toner hopper 80Y (hereinafter, toner hopper 80Y) for containing yellow toner and supplying it to the corresponding developing device 31.

The toner supply device 8 also includes a cyan toner hopper 80C (hereinafter, toner hopper 80C) for containing cyan toner and supplying it to the corresponding developing device 31 and a magenta toner hopper 80M (hereinafter, toner hopper 80M) for containing magenta toner and supplying it to the corresponding developing device 31. In such a toner supply device 8, the toner hopper 80K constitutes a first toner hopper and the toner hoppers 80Y, 80C and 80M respectively constitute a second toner hopper.

The image forming apparatus 1 is further provided with sheet cassettes 24 for storing sheets 23, a conveyor belt 25 for taking the sheets 23 out from the sheet cassettes 24 and conveying them, and a fixing device 29 for fixing toner images of the respective colors transferred to the sheet 23. The sheet 23 having the toner images fixed by the fixing device 29 is discharged to a discharge tray 40.

The image forming apparatus 1 is further provided with a toner agitating stepping motor control unit 100 (to be described later). The toner agitating stepping motor control unit 100 controls the rotation of a stepping motor 94 (to be described later) for agitating the toners contained in the toner hoppers 80M, 80C, 80Y and 80K through the rotation of agitation paddles 60 (to be described later) in the image forming apparatus 1. In the following description, the rotation of the stepping motor 94 is illustrated as a driving mode of the stepping motor 94.

In the image forming apparatus 1, each of the toner hoppers 80M, 80C, 80Y and 80K is internally provided with an agitation detection sensor 111A for detecting the agitation of the toner in each of the toner hoppers 80M, 80C, 80Y and 80K. The agitation detection sensors 111A detect the rotation of shafts 93K, 93Y, 93C and 93K (see FIG. 5) having the agitation paddles 60 (see FIG. 6) mounted thereon.

Such agitation detection sensors 111A output signals to notify toner agitation to a drive stop time level judging section (first level judging section) 111, which functions as an agitation time stop time level judging section (second level judging section) in a second starting torque value judging process to be described later, while detecting that the toners are agitated in the respective toner hoppers 80M, 80C, 80Y and 80K. Such agitation detection sensors 111A are used in the second starting torque value judging process.

The image forming apparatus 1 is also provided with temperature sensors 112A for measuring interior temperatures of the toner hoppers 80M, 80C, 80Y and 80K and humidity sensors 113A for measuring interior humidities of the toner hoppers 80M, 80C, 80Y and 80K. The inner temperatures of the toner hoppers 80M, 80C, 80Y and 80K measured by the temperature sensors 112A are output to the toner agitating stepping motor control unit 100. Further, the interior humidities of the toner hoppers 80M, 80C, 80Y and 80K measured by the humidity sensors 113A are also output to the toner agitating stepping motor control unit 100.

The interior temperatures of the respective toner hoppers 80M, 80C, 80Y and 80K are an example of an interior temperature of the image forming apparatus 1. Further, the interior humidities of the respective toner hoppers 80M, 80C, 80Y and 80K are an example of an interior humidity of the image forming apparatus 1.

Figure 2:
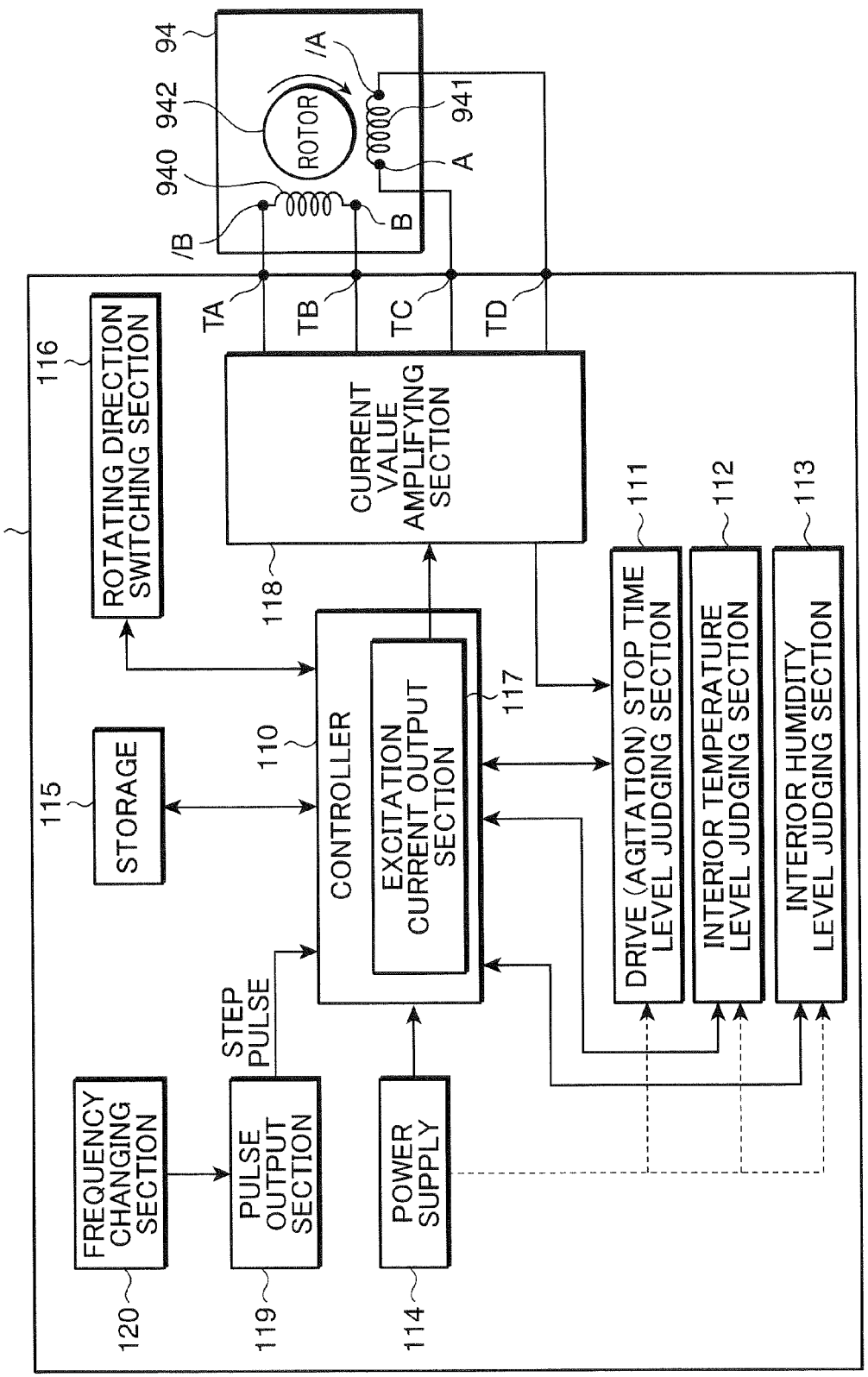
FIG. 2 is a block diagram outlining an exemplary toner agitating stepping motor control unit according to the one embodiment of the invention, FIG. 3 are tables showing an exemplary mode for storing a plurality of starting torque values required to start driving a stepping motor in a storage.

FIG. 2 is a block diagram outlining an example of the toner agitating stepping motor control unit 100 according to the embodiment of the present invention. Such a toner agitating stepping motor control unit 100 is used by being connected to the stepping motor 94.

In FIG. 2, the toner agitating stepping motor control unit 100 is provided with a controller 110, the drive stop time level judging section (agitation stop time level judging section) 111, an interior temperature level judging section 112, an interior humidity level judging section 113, a power supply 114, a storage 115, a rotating direction switching section 116, an excitation current output section 117. The controller 110 is, for example, constructed by a microcomputer or a CPU (Central Processing Unit) and controls the toner agitating stepping motor control unit 100 overall.

Particularly, the controller 110 detects that the stepping motor 94 is not rotated. The controller 110 detects that the stepping motor 94 is not rotated, for example, by detecting that no excitation current is output from the excitation current output section 117. Alternatively, the controller 110 detects that the stepping motor 94 is not rotated, for example, by detecting that a rotation detection sensor mounted on a rotary shaft 94A (see FIG. 8) of the stepping motor 94 is not detecting the rotation of the rotary shaft 94A.

When the stepping motor 94 is not rotating, the controller 110 notifies each of the drive stop time level judging section 111, the interior temperature level judging section 112 and the interior humidity level judging section 113 that the stepping motor 94 is not rotating. In this embodiment, the controller 110 notifies that the stepping motor 94 is not rotating by notifying that no excitation current is output from the excitation current output section 117.

Further, upon receiving an instruction signal for instructing the start of a process (e.g. image forming process), in which the stepping motor 94 should be rotated, through the operation of an operation unit (not shown) by a user, the controller 110 notifies the receipt of the instruction signal to each of the drive stop time level judging section 111, the interior temperature level judging section 112 and the interior humidity level judging section 113. Furthermore, the controller 110 performs a stepping motor control process to be described later.

The drive stop time level judging section 111 judges a drive stop time level indicating the duration of a time during which the stepping motor 94 is not rotated in a first starting torque value judging process to be described later. Thus, the drive stop time level judging section 111 includes a timer (not shown) for measuring time. The stepping motor 94 is not rotated, for example, when the image forming apparatus 1 is not on and when the power supply 114 is not supplying power to the excitation current output section 117 during the execution of the aforementioned sleep mode in the image forming apparatus 1.

The drive stop time level judging section 111 judges the drive stop time level as follows in the first starting torque value judging process to be described later. Specifically, the drive stop time level judging section 111 is notified from the controller 110 that the stepping motor 94 is not rotated. Thereafter, the drive stop time level judging section 111 measures the time during which the stepping motor 94 is not rotated, and the duration of the measured time is classified into three levels of "short", "medium" and "long". Then, the drive stop time level judging section 111 ends the measurement of the time during which the stepping motor 94 is not rotated when being notified of the receipt of the instruction signal for instructing the start of the process (e.g. image forming process), in which the stepping motor 94 should be rotated, from the controller 110.

The drive stop time level judging section 111 functions as the agitation stop time level judging section in the second starting torque value judging process, which is described in detail later.

The interior temperature level judging section 112 judges interior temperature levels of the respective toner hoppers from the interior temperatures measured by the temperature sensors 112A. The interior temperature level judging section 112 also classifies the respective interior temperature levels of the toner hoppers 80M, 80C, 80Y and 80K measured by the respective temperature sensors 112A into three levels of "high", "normal" and "low".

The interior humidity level judging section 113 judges interior humidity levels of the respective toner hoppers from the interior humidities measured by the humidity sensors 113A. The interior humidity level judging section 113 also classifies the respective interior humidity levels of the toner hoppers 80M, 80C, 80Y and 80K measured by the respective humidity sensors 113A into three levels of "high", "normal" and "low".

The power supply 114 supplies power necessary to operate the toner agitating stepping motor control unit 100 to the respective elements. The power supply 114 particularly constantly supplies power to the drive stop time level judging section (agitation stop time level judging section) 111, the interior temperature level judging section 112 and the interior humidity level judging section 113. The power supply 114 supplies power to each of the drive stop time level judging section 111, the interior temperature level judging section 112 and the interior humidity level judging section 113 so that the drive stop time level judging section 111, the interior temperature level judging section 112 and the interior humidity level judging section 113 can judge the drive stop time level (agitation stop time level), the interior temperature level and the interior humidity level even when the image forming apparatus 1 is off or while the aforementioned sleep mode is being executed in the image forming apparatus 1.

The storage 115 stores a plurality of starting torque values required to start the rotation of the stepping motor 94. A specific configuration of the storage 115 is described later. The rotating direction switching section 116 switches a rotating direction of the stepping motor 94 by switching the polarity of the excitation current output from the excitation current output section 117 to the opposite one.

The excitation current output section 117 is, for example, incorporated into the controller 110 and generates and outputs an excitation current for rotating the stepping motor 94 to the stepping motor 94. The excitation current output section 117 generates and outputs an excitation current in the same way as a method for generating and outputting an excitation current from a micro-stepping compatible motor driver with a known sequencer function upon receiving a step pulse output from a pulse output section 119. The excitation current generated and output from the excitation current output section 117 is an excitation current compatible with various excitation methods (one-phase excitation method, two-phase excitation method, 1-2 phase excitation method) and has a waveform corresponding to various excitation methods.

A current value amplifying section 118 amplifies the value of the excitation current output by the excitation current output section 117 with any one of a plurality of amplification factors so that the excitation current has a different excitation current value. Such a current value amplifying section 118 can be, for example, constructed by a transistor (e.g. bipolar transistor). By changing the value of a base current input to a base terminal in such a transistor, the value of an excitation current flowing from an emitter terminal to a collector terminal is amplified with any one of the plurality of different amplification factors.

The pulse output section 119 outputs a step pulse for determining the waveform of the excitation current output from the excitation current output section 117. As the pulse rate of such a step pulse increases, the rotating speed of the stepping motor 94 increases. A frequency changing section 120 changes the frequency of the step pulse output from the pulse output section 119. In other words, the frequency changing section 120 changes the pulse rate of the step pulse output from the pulse output section 119.

The above toner agitating stepping motor control unit 100 includes terminals TA, TB, TC and TD to connect the stepping motor 94. An excitation coil 940 of the stepping motor 94 is connected to the terminals TA and TB, wherein the terminal TA is in a "/B-phase" and the terminal TB is in a "B-phase". An excitation coil 941 of the stepping motor 94 is connected to the terminals TC and TD, wherein the terminal TC is in an "A-phase" and the terminal TD is in a "/A-phase".

In FIG. 2, a bipolar two-phase stepping motor including a plurality of excitation coils 940, 941 is illustrated as the stepping motor 94. In such a stepping motor 94, the opposite ends of the excitation coil 940 are connected to the terminals TA and TB of the toner agitating stepping motor control unit 100 and are in the "/B-phase" and "B-phase". The opposite ends of the excitation coil 941 are connected to the terminals TC and TD of the toner agitating stepping motor control unit 100 and are in the "A-phase" and "/A-phase".

The stepping motor 94 includes a rotor 942 (bipolar rotor) having an N-pole and an S-pole. The plurality of excitation coils 940 and 941 are arranged proximate to this rotor 940. When such a stepping motor 94 receives an excitation current output from the toner agitating stepping motor control unit 100, the respective voltage levels of "/B-phase", "B-phase", "/A-phase" and "A-phase" cyclically change and the excitation coils 940 and 941 are cyclically excited. In this way, the rotor 942 is rotated.

FIG. 3 are tables showing an exemplary mode for storing a plurality of starting torque values required to start driving the stepping motor 94 in the storage 115. FIG. 3A is a table showing an exemplary starting torque value table 115M corresponding to the toner hopper 80M containing the magenta toner. FIG. 3B is a table showing an exemplary starting torque value table 115C corresponding to the toner hopper 80C containing the cyan toner.

FIG. 3C is a table showing an exemplary starting torque value table 115Y corresponding to the toner hopper 80Y containing the yellow toner. FIG. 3D is a table showing an exemplary starting torque value table 115K corresponding to the toner hopper 80K containing the black toner.

In FIG. 3, a plurality of starting torque ratios are stored in correspondence with a plurality of combinations of the drive stop time level (agitation stop time level) T1, the interior humidity level HU and the interior temperature level TE in each of the starting torque value tables 115M, 115C, 115Y and 115K.

Here, as shown in FIG. 3, torque ratios are stored as starting torque values STM, STC, STY and STK corresponding to the toner hoppers 80M, 80C, 80Y and 80K in each table of the storage 115.

The torque ratio is set based on a reference starting torque value (not shown) stored beforehand as a reference value, based on which the torque ratio is to be set. For example, any one of values "1", "1.5" and "2" is stored as the torque ratio in FIG. 3.

In FIG. 3, the torque ratio "1" indicates that "each of the individual hopper starting torque values STM, STC, STY and STK is the reference torque value". The torque ratio "1.5" indicates that "each of the individual hopper starting torque values STM, STC, STY and STK is the reference torque value×1.5". The torque ratio "2" indicates that "each of the individual hopper starting torque values STM, STC, STY and STK is the reference torque value×2".

In this embodiment, the respective torque ratios based on the reference starting torque value are stored. However, the individual hopper starting torque values themselves may be stored.

Any one of the three levels "high", "normal" and "low" described above is stored as the interior humidity level HU and the interior temperature level TE in correspondence with each of the individual hopper starting torque values STM, STC, STY and STK in each of the starting torque value tables 115M, 115C, 115Y and 115K.

In this embodiment, any one of the three levels "high", "normal" and "low" described above is stored as the interior humidity level HU and the interior temperature level TE. However, ranges of interior humidity and interior temperature themselves may be stored as the interior humidity level HU and the interior temperature level TE. Alternatively, the interior humidity and interior temperature themselves may be stored.

In each of the starting torque value tables 115M, 115C, 115Y and 115K, any one of the three levels "short", "medium" and "long" described above is stored as the drive stop time level TI in correspondence with each of the individual hopper starting torque values STM, STC, STY and STK.

In this embodiment, any one of the three levels "short", "medium" and "long" described above is stored as the drive stop time level TI. However, the duration of the time during which the stepping motor 94 is not rotated may be stored as the drive stop time level TI.

Because of the presence of the respective starting torque value tables 115M, 115C, 115Y and 115K described above, the first starting torque value judging process described below becomes possible.

[First Starting Torque Value Judging Process]

The toner agitating stepping motor control unit 100 agitates the toners in the respective toner hoppers at once regardless of whether black-and-white printing or color printing is performed.

Accordingly, in the first starting torque value judging process described below, the drive stop time level TI originally indicating the duration of the time during which the stepping motor 94 is not rotated is handled as the agitation stop time level indicating the time during which the toners are not agitated in the toner hoppers of the respective colors by the controller 110.

The controller 110 uses all the starting torque value tables 115M, 115C, 115Y and 115K upon performing black-and-white printing and color printing and then obtains the respective individual hopper starting torque values STM, STC, STY and STK based on the actually judged interior temperature levels, interior humidity levels and drive stop time levels of the toner hoppers 80M, 80C, 80Y and 80K. The controller 110 obtains the total value of these individual hopper starting torque values STM, STC, STY and STK as a starting torque value ST required to start driving the stepping motor 94.

For example, if a combination of the drive stop time level indicating the time during which the stepping motor 94 has not been thus far rotated, the interior humidity level and interior temperature level of each of the toner hoppers 80M, 80C, 80Y and 80K is a combination of "long", "high" and "high", the controller 110 obtains the respective individual hopper starting torque values STM, STC and STY of "1.5" based on this combination. Further, the controller 110 obtains the individual hopper starting torque value STK of "2" based on this combination. Then, the controller 110 adds up the respective individual hopper starting torque values STM, STC, STY and STK. In other words, a value "6.5" expressed by "1.5"×"3"+"2" is obtained as the starting torque value ST.

Environments in which such a starting torque value is obtained include, for example, an environment in which the image forming apparatus 1 has been off at high temperature and high humidity until an image forming process is started and an environment in which the sleep mode has been executed. In such a first starting torque value judging process, the controller 110 may obtain the individual hopper starting torque values STM, STC, STY and STK from any one of the actually judged interior humidity level, interior temperature level and drive stop time level and obtains the total value of these as the starting torque value ST.

Figure 4:
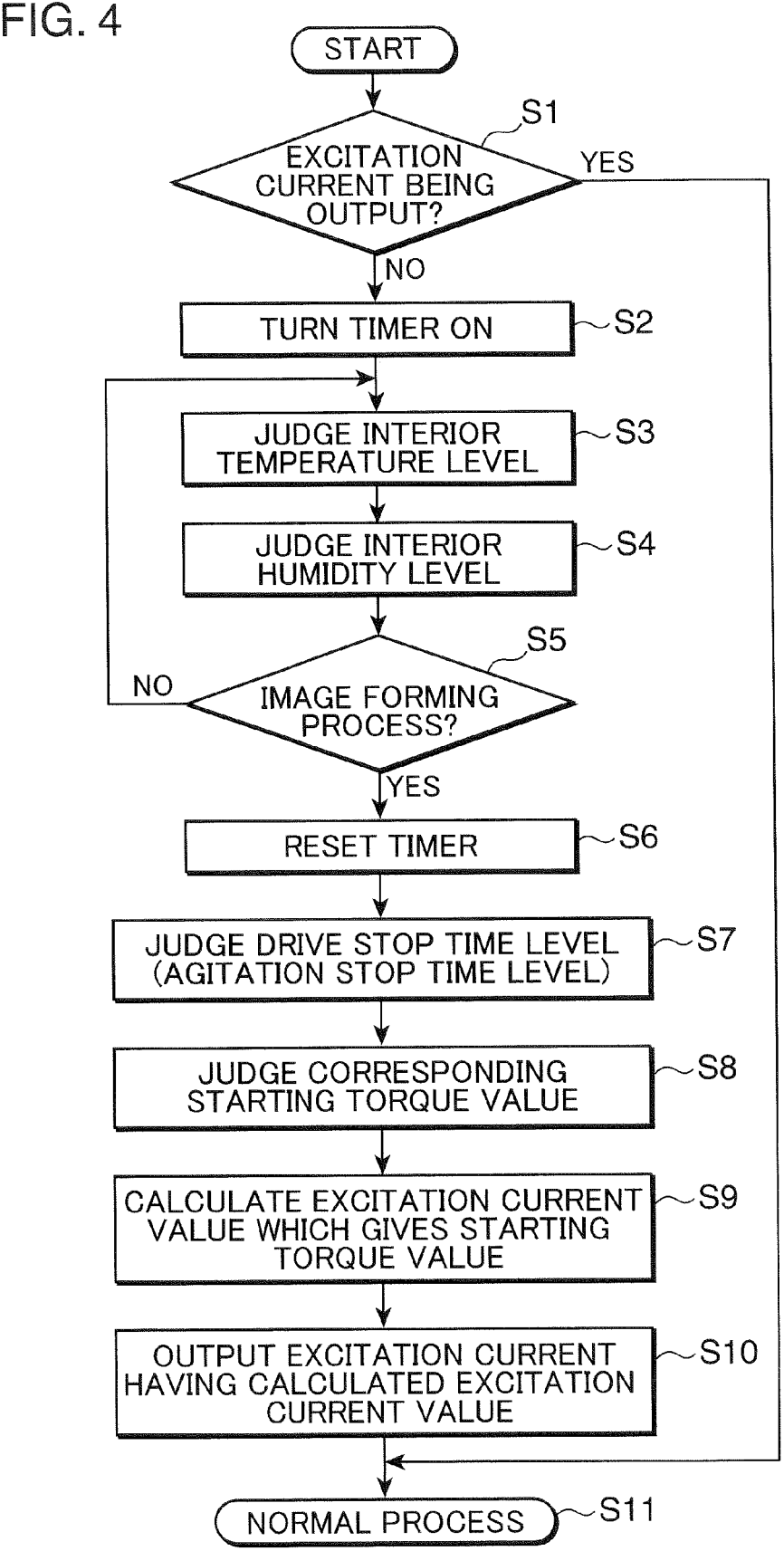
FIG. 4 is a flow chart outlining an exemplary stepping motor control process.

FIG. 4 is a flow chart outlining an exemplary stepping motor control process. The controller 110 judges whether or not an excitation current is output from the excitation current output section 117 (Step S1). If no excitation current is output (NO in Step S1), the controller 110 causes the drive stop time level judging section 111 to perform the following process. Specifically, the drive stop time level judging section 111 starts measuring time by turning the timer on (Step S2). On the other hand, if the excitation current is output (YES in Step S1), the controller 110 performs a normal process (Step S11) to be described later.

Then, the controller 110 causes the interior temperature level judging section 112 to perform the following process. Specifically, the interior temperature level judging section 112 judges the interior temperature levels of the respective toner hoppers 80M, 80C, 80Y and 80K (Step S3). In this way, the interior temperature levels of the respective toner hoppers 80M, 80C, 80Y and 80K are classified into any one of the levels "high", "normal" and "low".

Further, the controller 110 causes the interior humidity level judging section 113 to perform the following process. Specifically, the interior humidity level judging section 113 judges the interior humidity levels of the respective toner hoppers 80M, 80C, 80Y and 80K (Step S4). In this way, the interior humidity levels of the respective toner hoppers 80M, 80C, 80Y and 80K are classified into any one of the levels "high", "normal" and "low".

The processes (Steps S3 and S4) described above are performed until the controller 110 receives an instruction signal for instructing the start of an image forming process as a process to be performed by outputting an excitation current from the excitation current output section 117.

Upon receiving the instruction signal (YES in Step S5), the controller 110 causes the drive stop time level judging section 111 to perform the following process. Specifically, the drive stop time level judging section 111 ends time measurement by resetting the timer (Step S6). Then, the drive stop time level judging section 111 classifies the duration of the measured time into any one of the levels "short", "medium" and "long" as the drive stop time level indicating the time during which the stepping motor 94 is not rotated (Step S7).

Thereafter, the controller 110 obtains the starting torque value ST required to drive the stepping motor 94 by the aforementioned first starting torque value judging process (Step S8; starting torque value obtaining step).

The controller 110 may obtain the starting torque value ST by obtaining the drive stop time level and performing the first starting torque value judging process not only when the image forming process is started as in Step S5, but also immediately after the image forming apparatus 1 is turned on or the mode of the image forming apparatus 1 is returned from the above sleep mode to a normal mode.

Further, the controller 110 may perform the second starting torque value judging process described below instead of the first starting torque value judging process in the process shown in Step S8.

[Second Starting Torque Value Judging Process]

In this process, the controller 110 handles the drive stop time level TI as a level of a time during which the toner is not agitated in each of the toner hoppers 80M, 80C, 80Y and 80K (agitation stop time) in each of the starting torque value tables 115M, 115C, 115Y and 115K.

Further, the controller 110 causes the drive stop time level judging section 111 to perform the following process instead of the processes shown in Steps S2 and S6. Specifically, the drive stop time level judging section 111 constantly receives notification indicating toner agitation from the respective agitation detection sensors 111A.

Then, for each agitation detection sensor 111A, the drive stop time level judging section 111 gives a time during which the above notification is not received as an agitation stop time level (i.e. drive stop time level TI) to the controller 110. This enables the controller 110 to obtain the agitation stop time level for each toner hopper.

The agitation stop time level is expressed by any one of "short", "medium" and "long" similar to the above drive stop time level.

Then, the controller 110 obtains the interior humidity level, the interior temperature level and the duration of the time during which the toner is not agitated (agitation stop time level) of each of the toner hoppers 80M, 80C, 80Y and 80K. The controller 110 obtains each of the individual hopper starting torque values STM, STC, STY and STK corresponding to the combination of the obtained interior humidity level, interior temperature level and the agitation stop time level by referring to the storage 115.

Thus, the controller 110 can perform the following process. Specifically, the controller 110 refers to the starting torque value table 115K upon performing black-and-white printing and then obtains the individual hopper starting torque value STK corresponding to the combination of the actually judged interior humidity level, interior temperature level and agitation stop time level of the toner hopper 80K as the starting torque value ST required to start driving the stepping motor 94.

For example, the controller 110 obtains the individual hopper starting torque value STK expressed by "1.5" based on the combination when the combination of the actually judged interior humidity level, the interior temperature level and the agitation stop time level of the toner hopper 80K is a combination of "short", "high" and "high" upon performing black-and-white printing.

On the other hand, the controller 110 refers to all the starting toner value tables 115M, 115C, 115Y and 115K upon performing color printing and then obtains the respective individual hopper starting torque values STM, STC, STY and STK corresponding to the combinations of the actually judged interior humidity level, interior temperature level and the agitation stop time level of the respective toner hoppers 80M, 80C, 80Y and 80K. The total value of these individual hopper starting torque values STM, STC, STY and STK is obtained as the starting toner value ST required to start driving the stepping motor 94.

For example, in a normal temperature and normal humidity environment, the interior humidity level and interior temperature level are "normal" and the agitation stop time level is "long" in each of the toner hoppers 80M, 80C and 80Y immediately after black-and-white printing is performed for a long time. On the other hand, since the members (e.g. fixing device 29) arranged near the toner hopper 80K are heated for a long time, the interior humidity level is "low", the interior temperature level is "high" and the agitation stop time level is "short" in the toner hopper 80K.

Thus, the controller 110 obtains the individual hopper starting toner value STK expressed by "1.5" based on the combination of the interior humidity level HU expressed by "low", the interior temperature level TE expressed by "high" and the agitation stop time level expressed by "short" in the starting toner value table 115K corresponding to the toner hopper 80K. On the other hand, the controller 110 obtains the respective individual hopper starting toner values STM, STC and STY expressed by "1.5" based on the interior humidity level HU expressed by "normal", the interior temperature level TE expressed by "normal" and the agitation stop time level expressed by "long" in the starting torque value tables 115M, 115C and 115Y corresponding to the toner hoppers 80M, 80C and 80Y.

Then, the controller 110 adds up these respective individual hopper starting toner values STM, STC, STY and STK. In other words, the controller 110 obtains a value "6.0" expressed by "1.5"×"3"+"1.5" as the starting toner value ST.

In such a second starting torque value judging process, the controller 110 may obtain the individual hopper starting torque values STM, STC, STY and STK from any one of the actually judged interior humidity level, interior temperature level and drive stop time level and obtains the total value of these as the starting torque value ST.

The controller 110 calculates an excitation current value which gives the starting toner value ST obtained in the process shown in Step S8 (Step S9; excitation current value calculating step). A method for calculating the excitation current value from the starting toner value ST is the same as a method in which a micro-stepping compatible motor driver with a known sequencer function calculates an excitation current which gives a desired starting toner value.

Then, the controller 110 causes the excitation current output section 117 to output an excitation current synchronized with a step pulse output from the pulse output section 119 and having the calculated excitation current value to the stepping motor 94 (Step S10; excitation current outputting step).

In such a process, the excitation current output section 117 receives an instruction to generate and output an excitation current from the controller 110. At this time, an instruction on an excitation current value is also received from the controller 110. Then, the excitation current output section 117 generates the excitation current synchronized with the step pulse output from the pulse output section 119. The excitation current generated by the excitation current output section 117 is amplified in the current value amplifying section 118 so that the excitation current value becomes the instructed excitation current value. The thus amplified excitation current is output to the stepping motor 94.

Thereafter, the controller 110 performs a normal process. The normal process is such that the controller 110 causes the excitation current output section 117 to calculate an excitation current value which gives a constant-speed torque smaller than the starting toner value ST when the frequency of the step pulse is a predetermined constant-speed frequency. That the frequency of the step pulse is the constant-speed frequency can be known an inverse of a period during which the respective excitation coils 940, 941 of the stepping motor 94 are excited per step pulse.

Since the excitation current value that gives the constant-speed torque value smaller than the starting toner value is calculated in the normal process in this way, the excitation current value of the excitation current output to the stepping motor 94 becomes smaller and a torque generated by the stepping motor 94 becomes smaller. Accordingly, the toner agitating stepping motor control unit 100 can deal with a case where the stepping motor 94 reaches a specified constant speed and a large torque is no longer necessary and power consumption can be suppressed.

In this embodiment, the starting torque value tables 115M, 115C, 115Y and 115K corresponding to the respective toner hoppers 80M, 80C, 80Y and 80K are present in the storage 115. However, the storage 115 may be configured as follows.

For example, the starting torque value table 115K corresponding to the toner hopper 80K is provided for black-and-white printing. In the starting torque value table 115K, a plurality of any one parameter out of the interior humidity level HU, the interior temperature level TE and the drive stop time level (agitation stop time level) TI or a plurality of combinations comprised of all of the interior humidity level HU, the interior temperature level TE and the drive stop time level (agitation stop time level) TI are stored in the starting torque value table 115K. A plurality of starting torque values ST required to start driving the stepping motor 94 are stored in correspondence with the respective parameters or the plurality of combinations comprised of all these parameters. The controller 110 judges the starting torque value ST to be obtained from the actually judged parameter or combination.

Further, one starting torque value table (hereinafter, called a "starting torque value table") corresponding to all the toner hoppers 80M, 80C, 80Y and 80K is provided for color printing. In the starting torque value table, a plurality of any one parameter out of the interior humidity level HU, the interior temperature level TE and the drive stop time level (agitation stop time level) TI or a plurality of combinations comprised of all of the interior humidity level HU, the interior temperature level TE and the drive stop time level (agitation stop time level) TI are stored in the starting torque value table. A plurality of starting torque values ST required to start driving the stepping motor 94 are stored in correspondence with the respective parameters or the plurality of combinations comprised of all these parameters.

The toner agitating stepping motor control unit 100 judges the starting torque value ST obtained from the actually judged parameter or combination. Also by the above configuration, an excitation current optimal to obtain a large torque required by the stepping motor 94 can be obtained according to any one of the interior humidity level HU, the interior temperature level TE and the drive stop time level TI or a combination of all these parameters.

Figure 5:
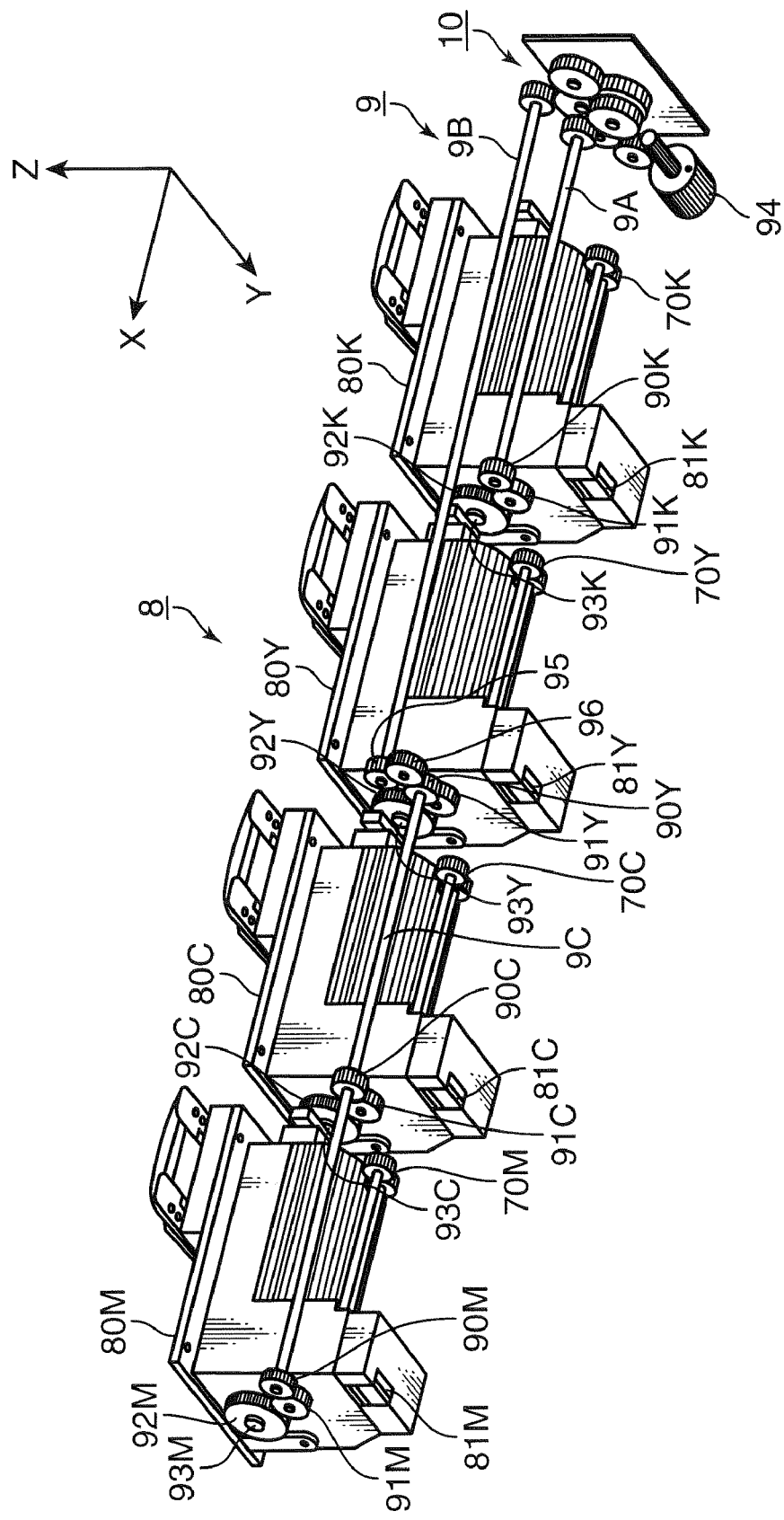
FIG. 5 is a perspective view showing an exemplary toner supply device provided in the image forming apparatus.

FIG. 5 is a perspective view showing an exemplary toner supply device provided in the image forming apparatus 1. In FIG. 5, the toner supply device 8 includes the respective toner hoppers 80K, 80Y, 80C and 80M and a paddle rotating mechanism 9 to be described later.

In the toner supply device 8, paddle rotating gears 90K, 90Y, 90C and 90M to be described later, idle gears 91K, 91Y, 91C and 91M engaged with the paddle rotating gears 90K, 90Y, 90C and 90M, and paddle gears 92K, 92Y, 92C and 92M engaged with the idle gears 91K, 91Y, 91C and 91M are arranged outside the respective toner hoppers 80K, 80Y, 80C and 80M. The respective paddle gears 92K, 92Y, 92C and 92M are concentrically fixed to one sides of shafts 93K, 93Y, 93C and 93M and integrally rotatable with the shafts 93K, 93Y, 93C and 93M.

The respective paddle rotating gears 90K, 90Y, 90C and 90M constitute parts of the paddle rotating mechanism 9 to be described later. The respective paddle rotating gears 90K, 90Y, 90C and 90M are engaged with the corresponding idle gears 91K, 91Y, 91C and 91M when the toner hoppers 80K, 80Y, 80C and 80M are installed into the image forming apparatus 1 from above in a Z-axis direction.

Thus, if the respective paddle rotating gears 90K, 90Y, 90C and 90M are rotated, rotational forces are transmitted to the corresponding paddle gears 92K, 92Y, 92C and 92M via the idle gears 91K, 91Y, 91C and 91M. Thus, if the respective paddle rotating gear 90K, 90Y, 90C and 90M are rotated, the corresponding paddle gears 92K, 92Y, 92C and 92M are rotated. At this time, the shafts 93K, 93Y, 93C and 93M can be integrally rotated with the paddle gears 92K, 92Y, 92C and 92M.

Figure 6:
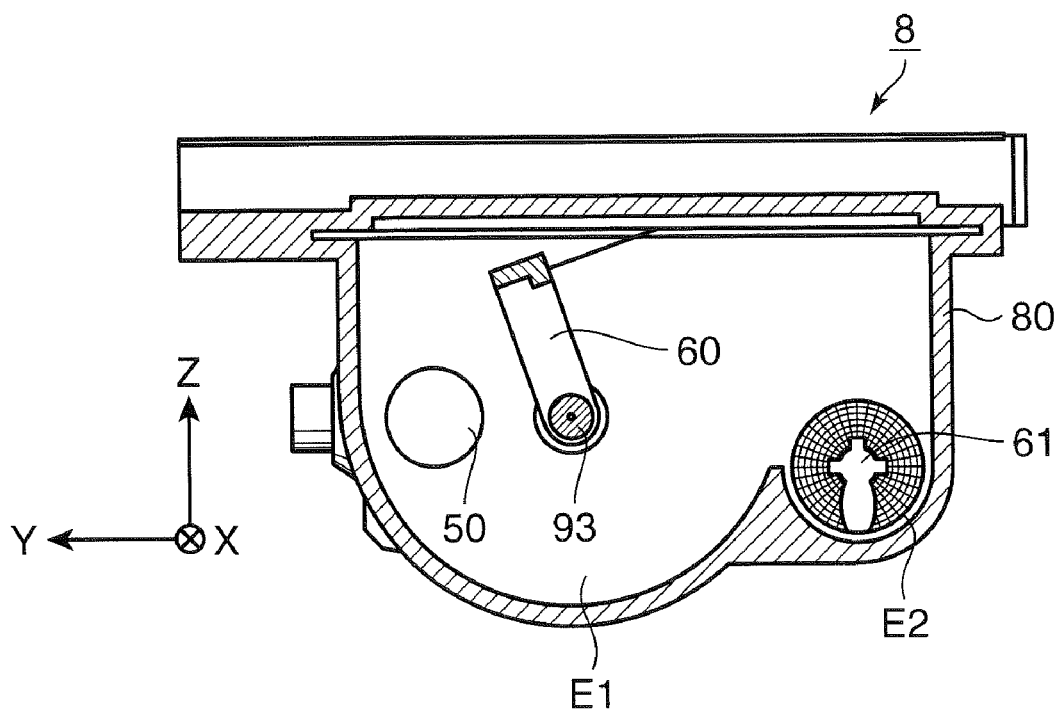
FIG. 6 is a side view in section of the toner supply device when viewed in an X direction.

An agitation paddle 60 and a conveyor spiral 61 are arranged as shown in FIG. 6 in each of the toner hoppers 80K, 80Y, 80C and 80M. FIG. 6 is a side view in section of the toner supply device 8 when viewed in an X direction. Here, the agitation paddle 60 arranged in the toner hopper 80K constitutes a first agitating portion. Further, the agitation paddles 60 arranged in the respective toner hoppers 80Y, 80C and 80M constitute a second agitating portion.

Conveyor spirals 61 are a collective name of conveyor spirals arranged in the respective toner hoppers 80K, 80Y, 80C and 80M. Further, shafts 93 are a collective name of the shafts 93K, 93Y, 93C and 93M arranged in the toner hoppers 80K, 80Y, 80C and 80M.

As shown in FIG. 6, the agitation paddle 60 is arranged in a central part of a large area E1 located in a Y-axis direction in the toner hopper 80 (collective name of the respective toner hoppers 80K, 80Y, 80C and 80M) and having a substantially U-shaped bottom surface, and is rotatable about the shaft 93 when the shaft 93 is rotated. Thus, when the shaft 93 is rotated by a rotational force of the paddle gear 92, the agitation paddle 60 can be rotated about the shaft 93. When the agitation paddle 60 is rotated, the toner contained in the toner hopper 80 is agitated and conveyed in a direction toward the conveyor spiral 61.

In the large area E1 of the toner hopper 80, a sensor 50 for detecting the remaining amount of the toner is arranged at the same height as the shaft 93 in the Z-axis direction. The remaining amount of the toner detected by the sensor 50 is notified to the controller 110. The controller 110 makes a notification upon judging that the remaining amount of the toner is small.

Functions of the conveyor spiral 61 are described below with reference to FIG. 6. The conveyor spiral 61 is arranged in a small area E2 located at a position corresponding to a toner supply port 81K, 81Y, 81C or 81M in the toner hopper 80 and having a substantially U-shaped bottom surface, and conveys the toner toward the toner supply port 81K, 81Y, 81C or 81M. The conveyor spiral 61 is rotated by a rotational force generated by the rotation of a conveyor spiral rotating motor 70K, 70Y, 70C or 70M provided in correspondence with the toner hopper 80K, 80Y, 80C or 80M. The toner collected near the toner supply port 81K, 81Y, 81C or 81M is supplied to the corresponding developing device 31 through the toner supply port 81K, 81Y, 81C or 81M.

In FIG. 5, the stepping motor 94 is rotated in forward and reverse directions to generate a rotational force and can give the rotational force to the agitation paddles 60 arranged in the respective toner hoppers 80K, 80Y, 80C or 80M. The toner supply device 8 includes the agitation paddle rotating mechanism 9 described below so that the rotational force is generated by rotating the stepping motor 94 in forward and reverse directions and given to the respective agitation paddles 60. In FIG. 5, the toner supply device 8 includes a relay gear 95 and an idle gear 96. Functions of the relay gear 95 and the idle gear 96 are described later.

Figure 7:
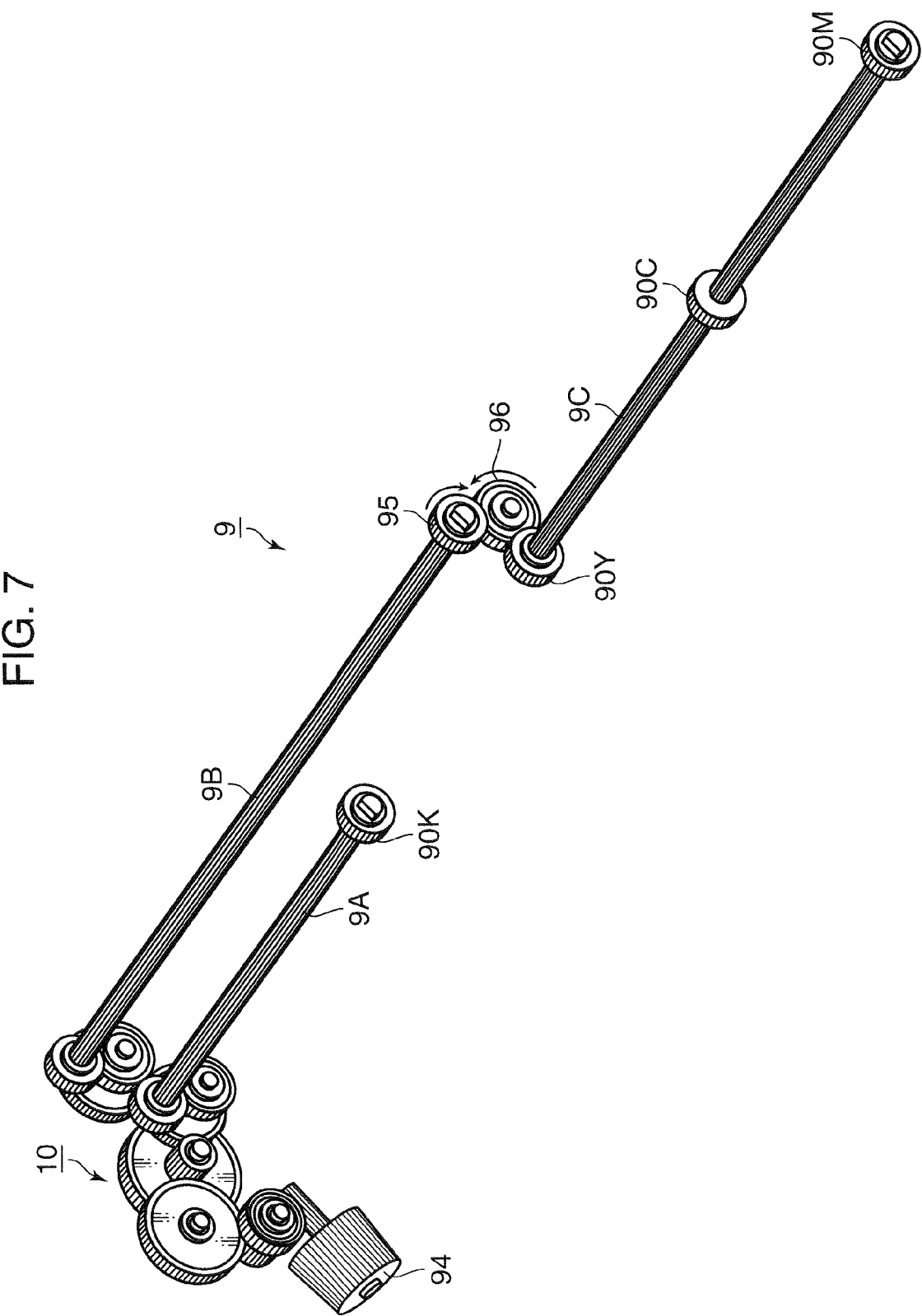
FIG. 7 is a perspective view showing an exemplary agitation paddle rotating mechanism, FIG. 8 are diagrams showing an exemplary construction of a transmission switching assembly.

FIG. 7 is a perspective view showing an exemplary agitation paddle rotating mechanism. The agitation paddle rotating mechanism 9 includes the stepping motor 94, a transmission switching assembly 10, a first shaft (first transmission shaft) 9A, a second shaft (second transmission shaft) 9B, a third shaft 9C, the relay gear 95, the idle gear 96 and the paddle rotating gears 90K, 90Y, 90C or 90M.

In the agitation paddle rotating mechanism 9, the paddle rotating gear 90K is concentrically fixed to one end of the first shaft 9A and integrally rotatable with the first shaft 9A. The paddle rotating gear 90Y is concentrically fixed to one end of the third shaft 9C and integrally rotatable with the third shaft 9C. The paddle rotating gear 90C is concentrically fixed to an intermediate part of the third shaft 9C and integrally rotatable with the third shaft 9C. The paddle rotating gear 90M is concentrically fixed to the other end of the third shaft 9C and integrally rotatable with the third shaft 9C.

In the agitation paddle rotating mechanism 9, the relay gear 95 is concentrically fixed to one end of the second shaft 9B and integrally rotatable with the second shaft 9B. Such a relay gear 95 is engaged with the idle gear 96. The idle gear 96 is engaged with the paddle rotating gear 90Y. Thus, a rotational force of the second shaft 9B is transmitted to the third shaft 9C via the relay gear 95 and the idle gear 96.

In such an agitation paddle rotating mechanism 9, a rotational force in the forward direction generated in the stepping motor 94 is transmitted as a rotational force to the first shaft 9A by the transmission switching assembly 10. This causes the first shaft 9A to rotate. When the first shaft 9A is rotated, the paddle rotating gear 90K is rotated in the same direction as the first shaft 9A. Thus, the agitation paddle 60 arranged in the toner hopper 80K is rotated.

On the other hand, in the agitation paddle rotating mechanism 9, a rotational force in the reverse direction generated in the stepping motor 94 is transmitted to the first shaft 9A and the second shaft 9B by the transmission switching assembly 10. This causes the first shaft 9A and the second shaft 9B to rotate. Since the paddle rotating gear 90K is rotated in the same direction as the first shaft 9A when the first shaft 9A is rotated, the agitation paddle 60 arranged in the toner hopper 80K is rotated.

Further, when the second shaft 9B is rotated, the relay gear 95 is rotated in the same direction as the second shaft 9B. Then, the idle gear 96 is rotated in a direction opposite to the relay gear 95 and the rotational force is transmitted to the paddle rotating gear 90Y, wherefore the paddle rotating gear 90Y is rotated in the same direction as the second shaft 9B. Thus, the paddle rotating gears 90C and 90M fixed to the second shaft 9B are also rotated in the same direction as the second shaft 9B. Therefore, the agitation paddles 60 arranged in the toner hoppers 80Y, 80C and 80M are rotated.

Figure 8A:
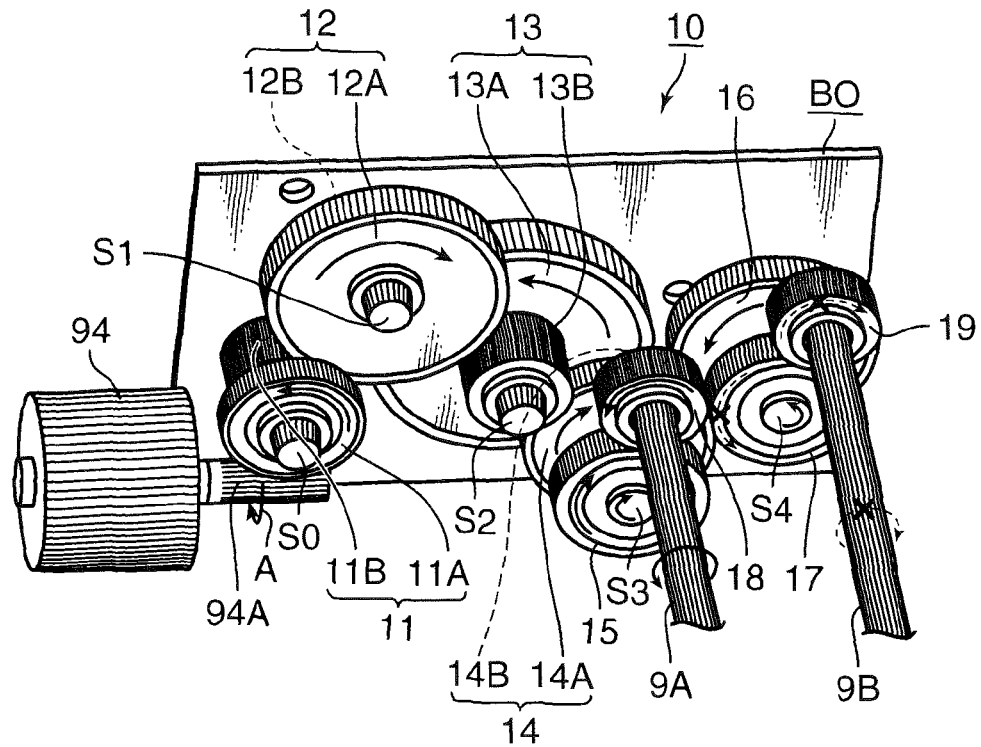
Figure 8B:
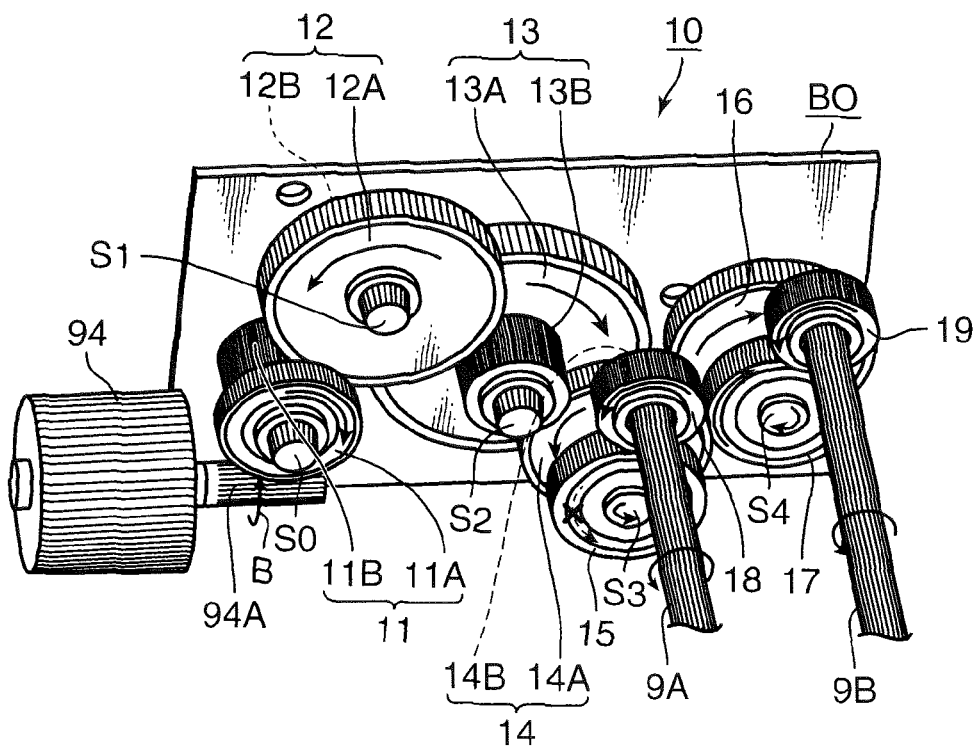

FIG. 8 are diagrams showing an exemplary construction of the transmission switching assembly. FIG. 8A shows a state when the stepping motor 94 is rotated in the forward direction and FIG. 8B shows a state when the stepping motor 94 is rotated in the reverse direction.

The toner agitating stepping motor control unit 100 outputs an excitation current having a predetermined waveform to the stepping motor 94 so that the stepping motor 94 is rotated in either forward or reverse direction in the transmission switching assembly 10. When the rotating direction switching section 116 reverses the polarity of the excitation current in the toner agitating stepping motor control unit 100, the rotating direction of the stepping motor 94 is reversed.

Here, from the perspective of making a torque generated when the stepping motor 94 is rotated in the reverse direction larger than the one generated when the stepping motor 94 is rotated in the forward direction, the value of the excitation current output to the stepping motor 94 to drive the stepping motor 94 in the reverse direction is preferably larger than that of the excitation current output to the stepping motor 94 to drive the stepping motor 94 in the forward direction.

This is because a larger torque is necessary to agitate the toners in all the toner hoppers 80M, 80C, 80Y and 80K by rotating the stepping motor 94 in the reverse direction than to agitate the toner in the toner hopper 80K by rotating the stepping motor 94 in the forward direction as described later since more agitation paddles 60 are rotated. The larger the value of the excitation current output to the stepping motor 94, the larger torque is generated in the stepping motor 94, wherefore a torque of a necessary magnitude can be obtained.

The toner agitating stepping motor control unit 100 realizes the following process by performing the second starting torque value judging process described above. Specifically, upon performing black-and-white printing in the image forming apparatus 1, the toner agitating stepping motor control unit 100 causes the stepping motor 94 to rotate in the forward direction. At this time, the toner agitating stepping motor control unit 100 obtains the individual hopper starting torque value STK as an optimal starting torque value ST from the starting torque table 115K.

On the other hand, upon performing color printing in the image forming apparatus 1, the toner agitating stepping motor control unit 100 causes the stepping motor 94 to rotate in the reverse direction. At this time, the toner agitating stepping motor control unit 100 obtains the individual hopper starting torque values STM, STC, STY and STK from the starting torque value tables 115M, 115C, 115Y and 115K. Then, the toner agitating stepping motor control unit 100 obtains the total value of the respective obtained individual hopper starting torque values STM, STC, STY and STK as an optimal starting torque value ST.

In the second starting torque value judging process, the starting torque value ST obtained upon rotating the stepping motor 94 in the reverse direction is larger than the one obtained upon rotating the stepping motor 94 in the forward direction. Thus, the value of the excitation current output to rotate the stepping motor 94 in the reverse direction is large than that of the excitation current output to rotate the stepping motor 94 in the forward direction.

As shown in FIGS. 8A and 8B, the transmission switching assembly 10 has the following construction. The transmission switching assembly 10 includes idle gears 11, 12, 13 and 14, a one-way gear (first one-way transmitting member) 15, an idle gear 16, a one-way gear (second one-way transmitting member) 17, a relay gear (first transmitting member) 18 and a relay gear (second transmitting member) 19.

In such a transmission switching assembly 10, the idle gears 11 to 14 and 16 are so rotatably supported on a base plate BO as to be integrally rotatable with rotary shafts S0 to S4. Further, the one-way gears 15 and 17 are so rotatably supported on the base plate BO as to be integrally rotatable with the rotary shafts S3 and S4. The relay gear 18 is concentrically fixed to the other end of the first shaft 9A and integrally rotatable with the first shaft 9A. Further, the relay gear 19 is concentrically fixed to the other end of the second shaft 9B and integrally rotatable with the second shaft 9B.

The idle gear 11 is so rotatably supported on the base plate BO as to be integrally rotatable with the rotary shaft S0. The idle gear 11 is comprised of a large-diameter portion 11A, which is engaged with the rotary shaft 94A of the stepping motor 94 and to which a rotational force generated by the rotation of the rotary shaft 94A is transmitted, and a small-diameter portion 11B for transmitting the rotational force transmitted to the large-diameter portion 11A to an element arranged at a subsequent stage.

The idle gear 12 is so rotatably supported on the base plate BO as to be integrally rotatable with the rotary shaft S1. The idle gear 12 is comprised of a large-diameter portion 12A, which is engaged with the small-diameter portion 11B of the idle gear 11 and to which the rotational force from the small-diameter portion 11B of the idle gear 11 is transmitted, and a small-diameter portion 12B for transmitting the rotational force transmitted to the large-diameter portion 12A to an element arranged at a subsequent stage.

The idle gear 13 is so rotatably supported on the base plate BO as to be integrally rotatable with the rotary shaft S2. The idle gear 13 is comprised of a large-diameter portion 13A, which is engaged with the small-diameter portion 12B of the idle gear 12 and to which the rotational force from the small-diameter portion 12B of the idle gear 12 is transmitted, and a small-diameter portion 13B for transmitting the rotational force transmitted to the large-diameter portion 13A to an element arranged at a subsequent stage.

The idle gear 14 is so rotatably supported on the base plate BO as to be integrally rotatable with the rotary shaft S3. The idle gear 14 is comprised of a large-diameter portion 14A, which is engaged with the small-diameter portion 13B of the idle gear 13 and to which the rotational force from the small-diameter portion 13B of the idle gear 13 is transmitted, and a small-diameter portion 14B for transmitting the rotational force transmitted to the large-diameter portion 14A to an element arranged at a subsequent stage.

The one-way gear 15 is so rotatably supported on the base plate BO as to be integrally rotatable with the rotary shaft S3 and held in contact with the relay gear 18. The one-way gear 15 has a property of being integrally rotated with the rotary shaft S3 in a clockwise direction of FIG. 5, but being idly rotated about the rotary shaft S3 in a counterclockwise direction of FIG. 8. In other words, the one-way gear 15 has a property of being rotated by having the rotational force in the clockwise direction transmitted thereto from the rotary shaft S3, but remaining stationary without the rotational force of the rotary shaft S3 in the counterclockwise direction being transmitted thereto.

Thus, the one-way gear 15 is integrally rotated with the rotary shaft S3 by having the rotational force transmitted thereto from the rotary shaft S3 when the rotary shaft S3 is rotated in the clockwise direction. At this time, the rotational force of the rotary shaft S3 is transmitted to the relay gear 18 by the one-way gear 15. On the other hand, the one-way gear 15 is in a stationary state without the rotational force being transmitted from the rotary shaft S3 when the rotary shaft S3 is rotated in the counterclockwise direction. Thus, the rotational force is not transmitted from the one-way gear 15 to the relay gear 18.

The idle gear 16 is so rotatably supported on the base plate BO as to be integrally rotatable with the rotary shaft S4. The idle gear 16 is engaged with the small-diameter portion 14B of the idle gear 14 and has the rotational force transmitted thereto from the small-diameter portion 14B of the idle gear 14.

The one-way gear 17 is so rotatably supported on the base plate BO as to be integrally rotatable with the rotary shaft S4 and held in contact with the relay gears 18 and 19. The one-way gear 17 has a property of being integrally rotated with the rotary shaft S4 in the clockwise direction, but being idly rotated about the rotary shaft S4 in the counterclockwise direction. In other words, the one-way gear 17 has a property of being rotated by having the rotational force in the clockwise direction transmitted thereto from the rotary shaft S4, but remaining stationary without the rotational force of the rotary shaft S4 in the counterclockwise direction being transmitted thereto.

Thus, the one-way gear 17 is integrally rotated with the rotary shaft S4 by having the rotational force transmitted thereto from the rotary shaft S4 when the rotary shaft S4 is rotated in the clockwise direction. At this time, the rotational force of the rotary shaft S4 is transmitted to the relay gears 18 and 19 by the one-way gear 17. On the other hand, the one-way gear 17 is in a stationary state without the rotational force being transmitted thereto from the rotary shaft S4 when the rotary shaft S4 is rotated in the counterclockwise direction. Thus, the rotational force is not transmitted from the one-way gear 17 to the relay gears 18 and 19.

In the following description, a "rotational force in the forward direction" is a rotational force generated by the rotation of the rotary shaft 94A of the stepping motor 94 in a direction of arrow A shown in FIG. 8A. Further, a "rotational force in the reverse direction" is a rotational force generated by the rotation of the rotary shaft 94A of the stepping motor 94 in a direction of arrow B shown in FIG. 8B.

The transmission switching assembly 10 operates as shown in FIG. 8A when the stepping motor 94 generated a rotational force in the forward direction. The stepping motor 94 generates the rotational force in the forward direction to perform black-and-white printing. When the stepping motor 94 generated the rotational force in the forward direction, the transmission switching assembly 10 operates as shown in FIG. 8A, whereby the rotational force of the stepping motor 94 in the forward direction is transmitted to the agitation paddle 60 arranged in the toner hopper 80K and the black toner contained in the toner hopper 80K is agitated.

As shown in FIG. 8A, the idle gears 11, 12 and 13 are rotated in directions indicated by solid-line arrows. Then, the idle gear 14 is integrally rotated with the rotary shaft S3 in a direction indicated by a solid-line arrow. At this time, since the one-way gear 15 has the rotational force transmitted thereto from the rotary shaft S3 and is integrally rotated with the rotary shaft S3 in the arrow direction, the rotational force of the rotary shaft S3 is transmitted to the relay gear 18. Since the relay gear 18 is rotated in an arrow direction, the first shaft 9A is rotated in an arrow direction.

On the other hand, since the rotational force of the idle gear 14 is transmitted to the idle gear 16, the idle gear 16 is integrally rotated with the rotary shaft S4 in an arrow direction. However, the relay gear 19 is not rotated since the rotation of the rotary shaft S4 in the arrow direction is not transmitted to the one-way gear 17. Thus, the second shaft 9B is not rotated.

On the other hand, the transmission switching assembly 10 operates as shown in FIG. 8B when the stepping motor 94 generated a rotational force in the reverse direction. The stepping motor 94 generates the rotational force in the reverse direction to perform color printing. When the stepping motor 94 generated the rotational force in the reverse direction, the transmission switching assembly 10 operates as shown in FIG. 8B, whereby the rotational force of the stepping motor 94 in the reverse direction is transmitted to the agitation paddles 60 arranged in the toner hoppers 80M, 80C, 80Y and 80K and the toners of all the colors contained in the toner hoppers 80M, 80C, 80Y and 80K are agitated.

As shown in FIG. 8B, the idle gears 11, 12 and 13 are rotated in directions indicated by the solid-line arrows. Then, the idle gear 14 is integrally rotated with the rotary shaft S3 in the direction indicated by the solid-line arrow. At this time, since the one-way gear 15 has no rotational force transmitted thereto from the rotary shaft S3, the rotational force is not transmitted from the one-way gear 15 to the relay gear 18.

On the other hand, since the rotational force of the idle gear 14 is transmitted to the idle gear 16, the idle gear 16 is integrally rotated with the rotary shaft S4 in the arrow direction. At this time, since the one-way gear 17 is integrally rotated with the rotary shaft S4 in an arrow direction by having the rotational force transmitted thereto from the rotary shaft S4, the rotational force of the rotary shaft S4 is transmitted to the relay gears 18 and 19. Since the relay gears 18 and 19 are rotated in arrow directions, the first and second shafts 9A and 9B are rotated in arrow directions.

As described above, the rotational force is transmitted only to the first shaft 9A when the rotational force was generated in the forward direction, whereas the rotational force is transmitted to the first and second shafts 9A and 9B when the rotational force was generated in the reverse direction.

Figure 9:
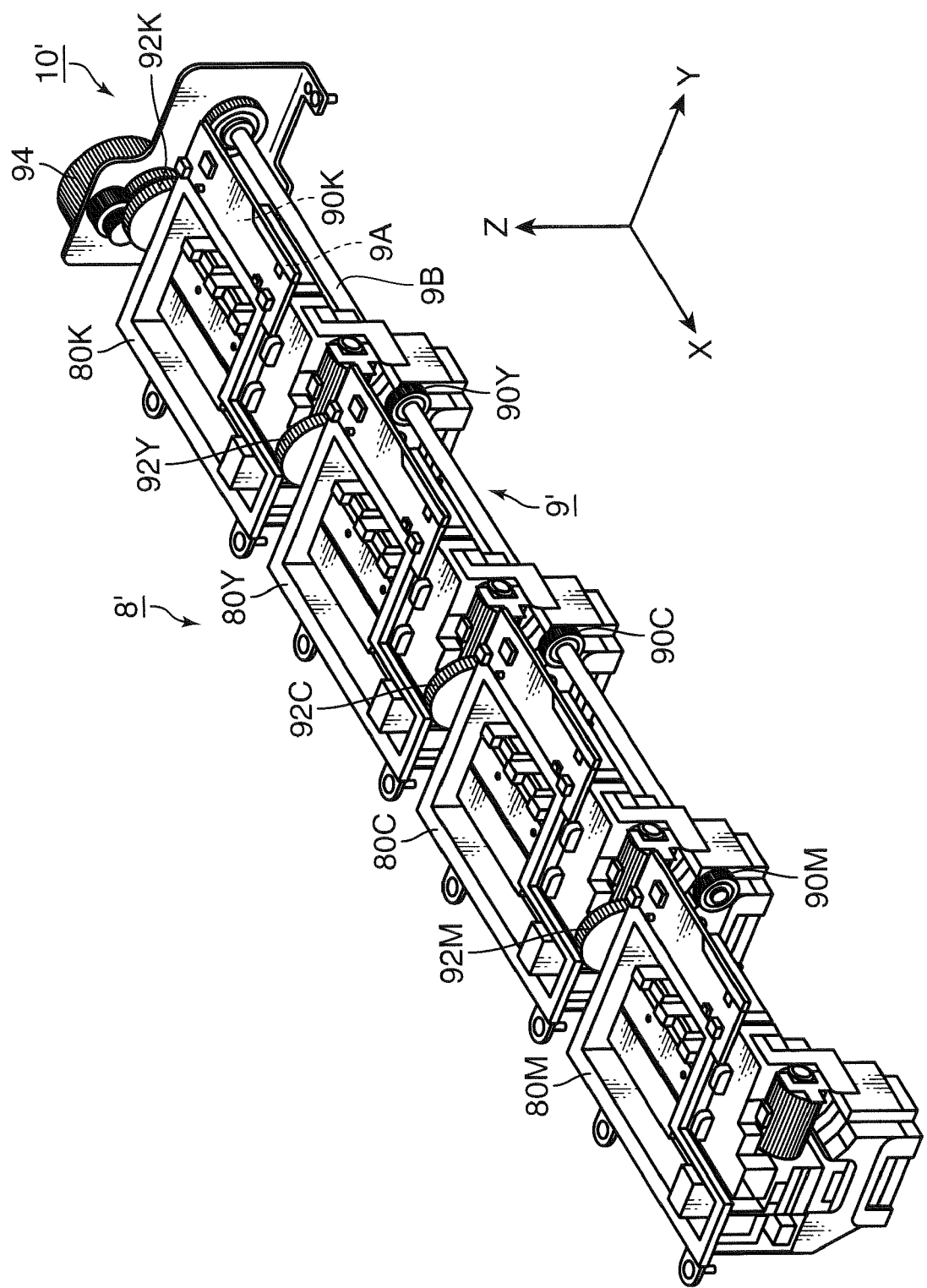
FIG. 9 is a perspective view showing another exemplary toner supply device.

FIG. 9 is a perspective view showing another exemplary toner supply device. FIG. 10 is a perspective view showing another exemplary agitation paddle rotating mechanism. In FIGS. 9 and 10, the same constituent elements as those shown in FIGS. 5 and 7 are identified by the same reference numerals and not described.

A toner supply device 8' shown in FIG. 9 includes an agitation paddle rotating mechanism 9' shown in FIG. 10. The agitation paddle rotating mechanism 9' differs from the agitation paddle rotating mechanism 9 (see FIG. 7) in that a paddle rotating gear 90M is concentrically fixed to one end of a second shaft 9B and integrally rotatable with the second shaft 9B. Further, paddle rotating gears 90Y and 90C are concentrically fixed to the second shaft 9B at equal intervals in an order of the paddle rotating gears 90Y and 90C in an X-axis direction between the one end and the other end of the second shaft 9B, and integrally rotatable with the second shaft 9B.

Paddle gears 92K, 92Y, 92C and 92M are respectively engaged with the paddle rotating gears 90K, 90Y, 90C and 90M without via the relay gear 96. The agitation paddle rotating mechanism 9' also includes a transmission switching assembly 10' for controlling the transmission of a rotational force generated in the stepping motor 94 to a first shaft (first transmission shaft) 9A and the second shaft (second transmission shaft) 9B.

In such an agitation paddle rotating mechanism 9', a rotational force in a forward direction generated in the stepping motor 94 is transmitted as a rotational force to the first shaft 9A by the transmission switching assembly 10'. This causes the first shaft 9A to rotate. When the first shaft 9A is rotated, the paddle rotating gear 90K is rotated in the same direction as the first shaft 9A. Thus, the agitation paddle 60 arranged in the toner hopper 80K is rotated.

On the other hand, in the agitation paddle rotating mechanism 9', a rotational force in a reverse direction generated in the stepping motor 94 is transmitted to the first and second shafts 9A, 9B by the transmission switching assembly 10'. Thus, the first and second shafts 9A, 9B are rotated.

Since the paddle rotating gear 90K is rotated in the same direction as the first shaft 9A when the first shaft 9A is rotated, the agitation paddle 60 arranged in the toner hopper 80K is rotated. Further, since the paddle rotating gears 90Y, 90C and 90M are rotated in the same direction as the second shaft 9B when the second shaft 9B is rotated, the agitation paddles 60 arranged in the toner hoppers 80Y, 80C and 80M are rotated.

Figure 11A:
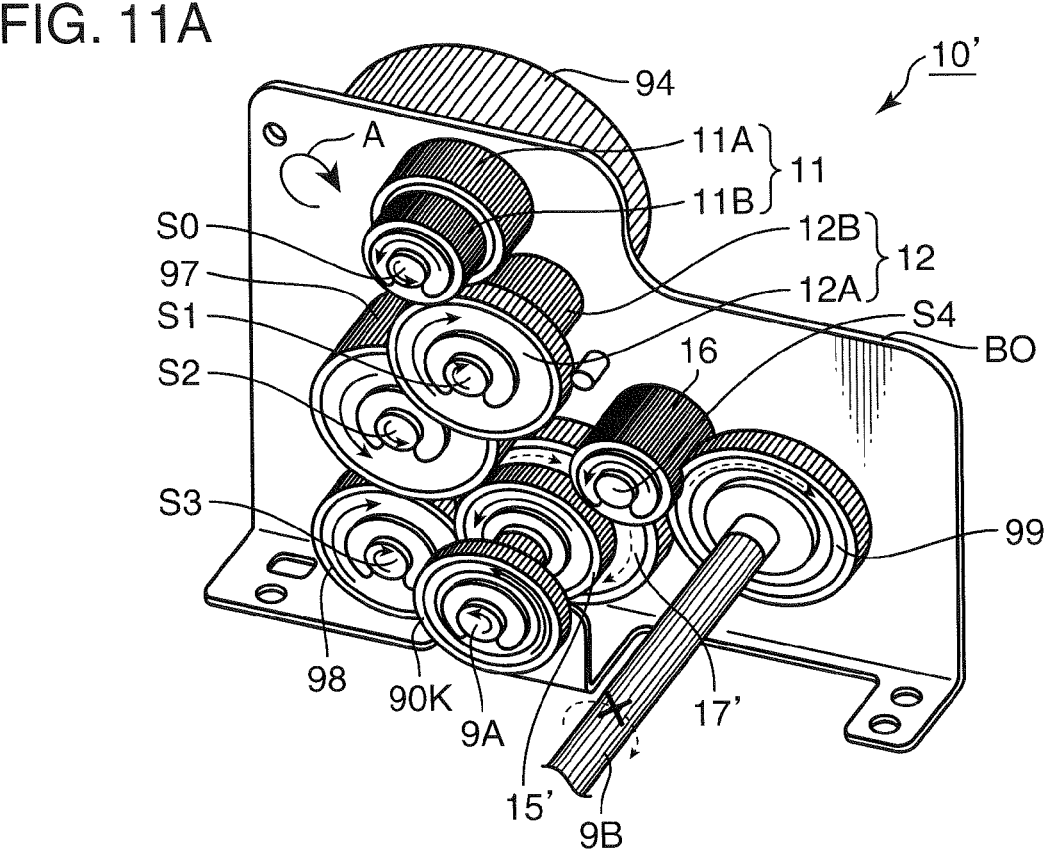
Figure 11B:
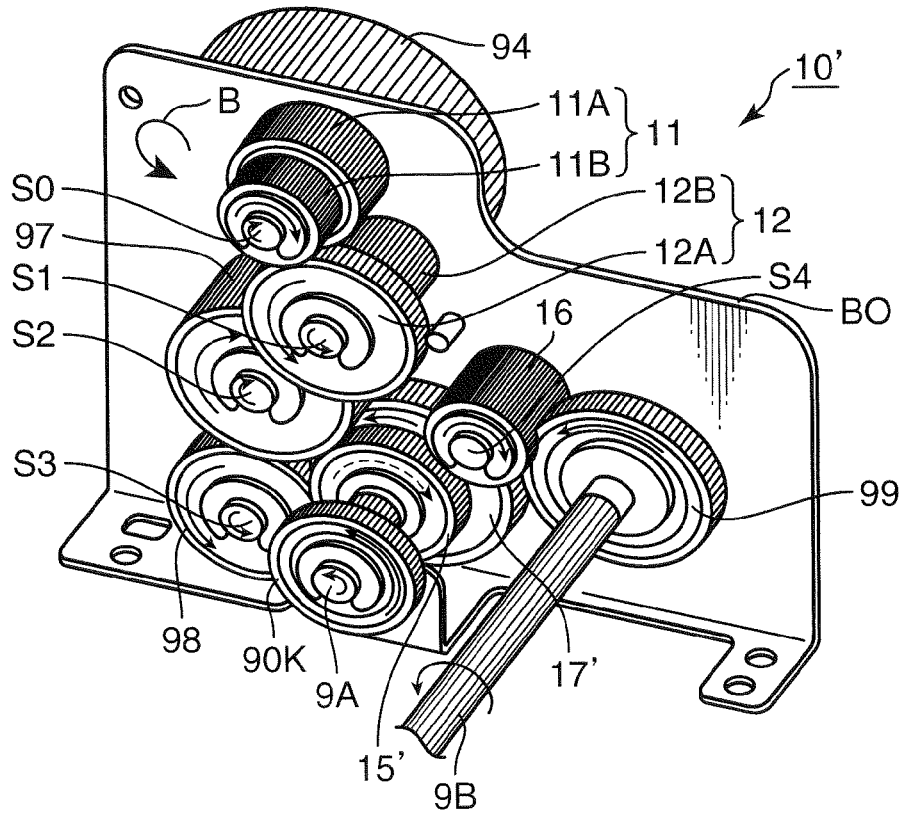

FIG. 11 are diagrams showing another exemplary construction of the transmission switching assembly. FIG. 11A shows a state where the stepping motor 94 is rotated in the forward direction. FIG. 11B shows a state when the stepping motor 94 is rotated in the reverse direction. The same constituent elements as those of the transmission switching assembly 10 shown in FIG. 8 are identified by the same reference numerals and not described.

As shown in FIGS. 11A and 11B, the transmission switching assembly 10' has the following construction. The transmission switching assembly 10' includes idle gears 11, 12, 97 and 98, a one-way gear (first one-way transmitting member) 15', a one-way gear (second one-way transmitting member) 17', an idle gear 16 and a one-way gear (third one-way transmitting member) 99.

In such a transmission switching assembly 10', the idle gears 11, 12, 16, 97 and 98 are so rotatably supported on a base plate BO as to be integrally rotatable with rotary shafts S0 to S4. The one-way gears 15' and 17' are so rotatably supported on the base plate BO as to be integrally rotatable with the first shaft 9A at the other end of the first shaft 9A. The one-way gear 98 is concentrically fixed to the other end of the second shaft 9B and supported on the base plate BO with the second shaft 9B as a rotary shaft.

The idle gear 11 is so rotatably supported on the base plate BO as to be integrally rotatable with the rotary shaft S0. The idle gear 11 is comprised of a large-diameter portion 11A, which is engaged with the rotary shaft 94A (not shown) of the stepping motor 94 and to which a rotational force generated by the rotation of the rotary shaft 94A is transmitted, and a small-diameter portion 11B for transmitting the rotational force transmitted to the large-diameter portion 11A to an element arranged at a subsequent stage.

The idle gear 12 is so rotatably supported on the base plate BO as to be integrally rotatable with the rotary shaft S1. The idle gear 12 is comprised of a large-diameter portion 12A, which is engaged with the small-diameter portion 11B of the idle gear 11 and to which the rotational force from the small-diameter portion 11B of the idle gear 11 is transmitted, and a small-diameter portion 12B for transmitting the rotational force transmitted to the large-diameter portion 12A to an element arranged at a subsequent stage.

The idle gear 97 is so rotatably supported on the base plate BO as to be integrally rotatable with the rotary shaft S2. The idle gear 97 is engaged with the small-diameter portion 12B of the idle gear 12 and has the rotational force transmitted thereto. The idle gear 97 also transmits the rotational force to elements at a subsequent stage (idle gear 98 and one-way gear 17').

The idle gear 98 is so rotatably supported on the base plate BO as to be integrally rotatable with the rotary shaft S3. The idle gear 98 is engaged with the idle gear 97 and has the rotational force transmitted thereto. The idle gear 98 also transmits the rotational force to an element at a subsequent stage (one-way gear 15').

The one-way gear 15' is in contact with the idle gear 98. The one-way gear 15' has a property of being integrally rotated with the first shaft 9A in a counterclockwise direction of FIG. 11, but being idly rotated about the first shaft 9A in a clockwise direction of FIG. 11.

In other words, the one-way gear 15' is rotated in the counterclockwise direction when a rotational force of the idle gear 98 in the clockwise direction of FIG. 11 is transmitted and transmits a rotational force in the counterclockwise direction to the first shaft 9A. Thus, the one-way gear 15' is integrally rotated with the first shaft 9A in the counterclockwise direction when the rotational force of the idle gear 98 in the clockwise direction is transmitted. On the other hand, the one-way gear 15' is idly rotated in the clockwise direction when a rotational force of the idle gear 98 in the counterclockwise direction of FIG. 11 is transmitted. Thus, the one-way gear 15' is idly rotated about the first shaft 9A in the clockwise direction and does not transmit the rotational force to the first shaft 9A when the rotational force of the idle gear 98 in the counterclockwise direction is transmitted.

The one-way gear 17' is in contact with the idle gears 97 and 16. Similar to the one-way gear 15', the one-way gear 17' has a property of being integrally rotated with the first shaft 9A in the counterclockwise direction of FIG. 11, but being idly rotated about the first shaft 9A in the clockwise direction of FIG. 11. Thus, the one-way gear 17' is integrally rotated with the first shaft 9A in the counterclockwise direction and transmits the rotational force to the idle gear 16 when a rotational force of the idle gear 98 in the clockwise direction is transmitted.

In other words, the one-way gear 17' is rotated in the counterclockwise direction and transmits the rotational force in the counterclockwise direction to the first shaft 9A and the idle gear 16 when the rotational force of the idle gear 97 in the clockwise direction shown in FIG. 11 is transmitted. Thus, the one-way gear 17' is integrally rotated with the first shaft 9A in the counterclockwise direction and transmits the rotational force to the idle gear 16 when the rotational force of the idle gear 98 in the clockwise direction is transmitted.

On the other hand, the one-way gear 17' is idly rotated about the first shaft 9A in the clockwise direction when a rotational force of the idle gear 97 in the counterclockwise direction of FIG. 11 is transmitted. Thus, the one-way gear 17' is idly rotated about the first shaft 9A in the clockwise direction and does not transmit the rotational force to the first shaft 9A and the idle gear 16 when a rotational force of the idle gear 98 in the counterclockwise direction is transmitted.

The idle gear 16 is in contact with the one-way gears 17' and 99, has a rotational force of the one-way gear 17' transmitted thereto and transmits the transmitted rotational force to an element at a subsequent stage (one-way gear 99).

The one-way gear 99 is in contact with the idle gear 16. The one-way gear 99 has a property of being integrally rotated with the second shaft 9B in the counterclockwise direction of FIG. 11, but being idly rotated about the second shaft 9B in the clockwise direction of FIG. 11.

In other words, the one-way gear 99 is rotated in the counterclockwise direction and transmits a rotational force in the counterclockwise direction to the second shaft 9B when a rotational force of the idle gear 16 in the clockwise direction of FIG. 11 is transmitted. Thus, the one-way gear 99 is integrally rotated with the second shaft 9B in the counterclockwise direction when the rotational force of the idle gear 16 in the clockwise direction is transmitted.

On the other hand, the one-way gear 99 is idly rotated about the second shaft 9B in the clockwise direction when a rotational force of the idle gear 16 in the counterclockwise direction of FIG. 11. Thus, the one-way gear 99 is idly rotated about the second shaft 9B in the clockwise direction and does not transmit the rotational force to the second shaft 9B when a rotational force of the idle gear 98 in the counterclockwise direction is transmitted.

In the following description, a "rotational force in the forward direction" is a rotational force generated by the rotation of the rotary shaft 94A (see FIG. 8) of the stepping motor 94 in a direction of arrow A shown in FIG. 11A (clockwise direction in FIG. 11). Further, a "rotational force in the reverse direction" is a rotational force generated by the rotation of the rotary shaft 94A of the stepping motor 94 in a direction of arrow B shown in FIG. 11B (counterclockwise direction in FIG. 11).

The transmission switching assembly 10' executes a control as shown in FIG. 11A when the stepping motor 94 generated a rotational force in the forward direction for black-and-white printing. In other words, the idle gears 11, 12, 97 and 98 are rotated in directions indicated by solid-line arrows. At this time, the first shaft 9A is rotated in an arrow direction since the one-way gear 15' transmits a rotational force transmitted from the idle gear 98 to the first shaft 9A.

On the other hand, the one-way gear 17' is idly rotated about the first shaft 9A in a direction indicated by a dotted-line arrow by the rotational force in the counterclockwise direction transmitted from the idle gear 97. At this time, a rotational force of the one-way gear 17' is transmitted to the idle gear 16 by the idle rotation of the one-way gear 17'. Thus, the idle gear 16 is rotated in the counterclockwise direction and a rotational force thereof is transmitted to the one-way gear 99. However, the one-way gear 99 is idly rotated about the second shaft 9B in a direction indicated by a dotted line arrow when the rotational force of the idle gear 16 in the counterclockwise direction is transmitted. Thus, no rotational force is transmitted to the second shaft 9B, wherefore the second shaft 9B is not rotated.

On the other hand, the transmission switching assembly 10' executes a control as shown in FIG. 11B when the stepping motor 94 generated a rotational force in the reverse direction for color printing. In other words, the idle gears 11, 12, 97 and 98 are rotated in directions indicated by solid-line arrows. At this time, the one-way gear 15' is idly rotated about the first shaft 9A in a direction indicated by a dotted-line arrow. On the other hand, the one-way gear 17' is integrally rotated with the first shaft 9A in a direction indicated by a solid-line arrow by having a rotational force of the idle gear 97 transmitted thereto. Thus, the first shaft 9A is rotated.

A rotational force of the one-way gear 17' is transmitted to the idle gear 16, which is in turn rotated in a direction indicated by a solid-line arrow. Thus, the one-way gear 99 is integrally rotated with the second shaft 9B in a direction indicated by a solid-line arrow by having a rotational force of the idle gear 16 transmitted thereto. Thus, the second shaft 9B is rotated.

The above specific embodiment mainly includes inventions having the following constructions.

A toner agitating stepping motor control unit according to one aspect of the present invention used in combination with a stepping motor to be driven upon receiving the input of an excitation current compatible with an excitation method for exciting a plurality of excitation coils comprises an excitation current output section for outputting the excitation current to the stepping motor; a first level judging section for judging a drive stop time level indicating the duration of a time during which the stepping motor is not driven; a storage storing a plurality of starting torque values required to start driving the stepping motor and a plurality of drive stop time levels while relating them to each other; and a controller for obtaining the starting torque value corresponding to the drive stop time level judged by the first level judging section by referring to the storage, calculating an excitation current value which gives the obtained starting torque value and outputting an excitation current having the calculated excitation current value.

According to this construction, the drive stop time level indicating the duration of the time during which the stepping motor is not driven is judged by the first level judging section. The starting torque value corresponding to the judged drive stop time level is judged from the plurality of starting torque values stored beforehand. Then, the excitation current value obtained from the judged starting torque value is calculated.

Thus, the starting torque value corresponding to the duration of the time during which the stepping motor is not driven is judged and the excitation current that gives this starting torque value is calculated. Then, the excitation current having this excitation current value is output to the stepping motor.

In this way, the toner agitating stepping motor control unit can judge the excitation current that gives the starting torque value corresponding to the duration of the time during which the stepping motor is not driven. Thus, a stepping motor driver can output an excitation current having an excitation current value which gives a large starting torque value, for example, when a time during which toner is not agitated by a driving force of the stepping motor continues and there is a possibility of toner adhesion. Therefore, it can be started to drive the stepping motor with a large starting torque when there is a possibility of toner adhesion.

The stepping motor generally does not require a feedback mechanism. In other words, the stepping motor is compatible with an open-loop control. Thus, the toner agitating stepping motor control unit does not require a feedback mechanism, thereby realizing a cost reduction.

In the above construction, it is preferable that a pulse output section for outputting a step pulse used for the excitation current output section to output the excitation current is further provided; and that the controller calculates an excitation current value which gives a constant-speed torque value predetermined to drive the stepping motor at a constant speed and smaller than the plurality of respective starting torque values when the frequency of the step pulse is a predetermined constant-speed frequency.

According to this construction, it is understood that a driving speed of the stepping motor has already reached the predetermined constant speed when the step pulse having the predetermined constant-speed frequency is obtained. Thus, the toner agitating stepping motor control unit calculates the excitation current value that gives the constant-speed torque value smaller than the respective starting torque values and reduces a torque generated by the stepping motor when the frequency of the step pulse is the predetermined constant-speed frequency. Accordingly, the toner agitating stepping motor control unit can deal with a case where the stepping motor has reached a specific constant speed and no large torque is necessary, thereby suppressing power consumption.

In the above construction, it is preferable that the toner agitating stepping motor control unit is arranged in an image forming apparatus for forming an image on a recording medium and further comprises an interior temperature level judging section for judging an interior temperature level indicating a level of the interior temperature of the image forming apparatus while the stepping motor is not driven; that the storage stores the plurality of respective starting torque values and a plurality of interior temperature levels while relating them to each other; and the controller obtains the starting torque value corresponding to the interior temperature level judged by the interior temperature level judging section by referring to the storage and calculates an excitation current value which gives the obtained starting torque value.

According to this construction, the interior temperature level indicating the level of the interior temperature of the image forming apparatus is judged by the interior temperature level judging section while the stepping motor is not driven. When the interior temperature level judged while the stepping motor is not driven is a given level, there is a possibility of toner adhesion if toner to be agitated by a rotational force of the stepping motor is present. Thus, the toner agitating stepping motor control unit obtains the starting torque value corresponding to the interior temperature level judged while the stepping motor is not driven and calculates the excitation current value that gives this starting torque value.

Therefore, the toner agitating stepping motor control unit can output an excitation current having an excitation current value which gives a large starting torque value and start driving the stepping motor with a large torque, for example, when there is a possibility of adhesion of toner to be agitated by a driving force of the stepping motor.

In the above construction, it is preferable that the toner agitating stepping motor control unit is arranged in an image forming apparatus for forming an image on a recording medium and further comprises an interior humidity level judging section for judging an interior humidity level indicating a level of the interior humidity of the image forming apparatus while the stepping motor is not driven; that the storage stores the plurality of respective starting torque values and a plurality of interior humidity levels while relating them to each other; and the controller obtains the starting torque value corresponding to the interior humidity level judged by the interior humidity level judging section by referring to the storage and calculates an excitation current value which gives the obtained starting torque value.

According to this construction, the interior humidity level indicating the level of the interior humidity of the image forming apparatus is judged by the interior humidity level judging section while the stepping motor is not driven. When the interior humidity level judged while the stepping motor is not driven is a given level, there is a possibility of toner adhesion if toner to be agitated by a rotational force of the stepping motor is present. Thus, the toner agitating stepping motor control unit obtains the starting torque value corresponding to the interior humidity level judged while the stepping motor is not driven and calculates the excitation current value that gives this starting torque value.

Therefore, the toner agitating stepping motor control unit can output an excitation current having an excitation current value which gives a large starting torque value and start driving the stepping motor with a large torque, for example, when there is a possibility of adhesion of toner to be agitated by a driving force of the stepping motor.

In the above construction, it is preferable that the toner agitating stepping motor control unit is arranged in an image forming apparatus for forming an image on a recording medium and further comprises an interior temperature level judging section for judging an interior temperature level indicating a level of the interior temperature of the image forming apparatus while the stepping motor is not driven and an interior humidity level judging section for judging an interior humidity level indicating a level of the interior humidity of the image forming apparatus while the stepping motor is not driven; that the storage stores the plurality of respective starting torque values and a plurality of combinations of the drive stop time level, the interior temperature level and the interior humidity level while relating them to each other; and the controller obtains the starting torque value corresponding to the combination of the drive stop time level judged by the first level judging section, the interior temperature level judged by the interior temperature level judging section and the interior humidity level judged by the interior humidity level judging section by referring to the storage and calculates an excitation current value which gives the obtained starting torque value.

According to this construction, the drive stop time level indicating the time during which the stepping motor is not driven is judged. Simultaneously, the interior temperature level indicating the level of the interior temperature of the image forming apparatus is judged by the interior temperature level judging section while the stepping motor is not driven and the interior humidity level indicating the level of the interior humidity of the image forming apparatus is judged by the interior humidity level judging section while the stepping motor is not driven.

The starting torque value corresponding to the combination of the judged drive stop time level, interior temperature level and interior humidity level is judged from the plurality of combinations (combinations of the drive stop time level, the interior temperature level and the interior humidity level) stored beforehand. Then, the excitation current that gives the judged starting torque value is calculated.

By this, the starting torque value corresponding to the combination of the duration of the time during which the stepping motor is not driven, the interior temperature level judged while the stepping motor is not driven and the interior humidity level judged while the stepping motor is not driven is judged and the excitation current that gives this starting torque value is calculated. Then, an excitation current having this excitation current value is output to the stepping motor. In this way, the toner agitating stepping motor control unit can judge an excitation current value which gives a starting torque value corresponding to a plurality of different parameters (i.e. duration of the time during which the stepping motor is not driven, interior temperature level judged during this time, and interior humidity level judged during this time).

Thus, the toner agitating stepping motor control unit can carefully judge a condition with a possibility of toner adhesion from many parameters and obtain an excitation current value which gives a starting torque suitable for the agitation of toner, for example, when the toner is agitated by a driving force of the stepping motor.

In the above construction, it is preferable that the toner agitating stepping motor control unit is arranged in an image forming apparatus including a plurality of toner hoppers for containing toners of different colors and an agitating portion for agitating the toners contained in the plurality of respective toner hoppers and adapted to form an image on a recording medium and further comprises a second level judging section for judging an agitation stop time level indicating the duration of a time during which the toner is not agitated in each of the plurality of toner hoppers, an interior temperature level judging section for judging an interior temperature level indicating a level of the interior temperature of each of the plurality of toner hoppers in each of the plurality of toner hoppers while the toner is not agitated, and an interior humidity level judging section for judging an interior humidity level indicating a level of the interior humidity of each of the plurality of toner hoppers in each of the plurality of toner hoppers while the toner is not agitated; that the storage stores a plurality of individual hopper starting torques required for the stepping motor to agitate the toners contained in the plurality of respective toner hoppers and a plurality of combinations of the agitation stop time level, the interior temperature level and the interior humidity level for each of the plurality of toner hoppers while relating to each other; and that the controller obtains the individual hopper starting torque values corresponding to the combination of the agitation stop time level judged by the second level judging section, the interior temperature level judged by the interior temperature level judging section and the interior humidity level judged by the interior humidity level judging section for each of the plurality of toner hoppers by referring to the storage and calculates an excitation current value which gives a starting torque value expressed by the total value of the obtained individual hopper starting torque values.

According to this construction, a plurality of combinations comprised of the time during which the toner is not agitated and the interior temperature and interior humidity of the toner hopper while the toner is not agitated are stored for each toner hopper. A combination agreeing with the combination of the time during which the toner is not agitated and the interior temperature and interior humidity of the toner hopper while the toner is not agitated, which are actually judged, is obtained from the storage and the individual hopper starting torque values corresponding to the obtained combination are obtained.

Thus, the toner agitating stepping motor control unit can carefully judge a condition with a possibility of toner adhesion from many parameters for the toner contained in each toner hopper. Therefore, the toner agitating stepping motor control unit can obtain an excitation current value which gives an optimal starting torque to agitate the toners contained in all the toner hoppers.

An image forming apparatus according to another aspect of the present invention comprises a toner agitating stepping motor control unit; a stepping motor to be driven upon receiving an excitation current compatible with an excitation method for exciting a plurality of excitation coils; a first toner hopper for containing black toner; a plurality of second toner hoppers for containing different color toners; a first agitating portion arranged in the first toner hopper for agitating the black toner by a driving force generated by driving the stepping motor; a plurality of second agitating portions each arranged in the corresponding one of the plurality of second toner hoppers for agitating the color toner by the driving force generated by driving the stepping motor; a first transmission shaft for transmitting the driving force to the first agitating portion; a second transmission shaft for transmitting the driving force to the respective second agitating portions; and a transmission switching assembly for transmitting a driving force of the stepping motor in a reverse direction to the first and second transmission shafts while transmitting a driving force of the stepping motor in a forward direction to the first transmission shaft; wherein the toner agitating stepping motor control unit includes an excitation current output section for outputting the excitation current to the stepping motor; a first level judging section for judging a drive stop time level indicating the duration of a time during which the stepping motor is not driven; a storage storing a plurality of starting torque values required to start driving the stepping motor and a plurality of drive stop time levels while relating them to each other; and a controller for obtaining the starting torque value corresponding to the drive stop time level judged by the first level judging section by referring to the storage, calculating an excitation current value which gives the obtained starting torque value and outputting an excitation current having the calculated excitation current value.

According to this construction, if the stepping motor is driven in the forward direction, a driving force is transmitted to the first agitating portion, whereby the black toner contained in the first toner hopper is agitated. On the other hand, if the stepping motor is driven in the reverse direction, a driving force is transmitted to the first and second agitating portions, whereby the black toner and the plurality of color toners contained in the first toner hopper and the plurality of second toner hoppers are respectively agitated. Thus, whether a driving force generated in the stepping motor is transmitted to only the first agitating portion or to all of the first agitating portion and the plurality of second agitating portions is controlled according to whether a driving direction of one stepping motor is a forward direction or a reverse direction.

Accordingly, a number of stepping motors corresponding to the respective first agitating portion and second agitating portions are not necessary. Further, the toner agitating stepping motor control unit needs not control the number of stepping motors corresponding to the respective first and second agitating portions. Furthermore, an electronic component (e.g. electromagnetic clutch or solenoid) is not necessary which controls whether the driving force of the stepping motor is transmitted only to the first agitating portion or to all of the first agitating portion and the plurality of second agitating portions. Therefore, power consumption is suppressed.

In the above construction, the excitation current value of the excitation current output to the stepping motor to drive the stepping motor in the reverse direction is preferably larger than that of the excitation current output to the stepping motor to drive the stepping motor in the forward direction.

According to this construction, the excitation current value of the excitation current output to the stepping motor to drive the stepping motor in the reverse direction is larger than that of the excitation current output to the stepping motor to drive the stepping motor in the forward direction. Thus, a torque for driving the stepping motor in the reverse direction is larger than the one for driving the stepping motor in the forward direction. Since the torque for driving the stepping motor in the reverse direction is larger than the one for driving the stepping motor in the forward direction in this way, the stepping motor can smoothly transmit the driving force to the first and second transmission shafts by being driven in the reverse direction. Therefore, the first agitating portion and the plurality of second agitating portions can be smoothly controlled to agitate the toners by transmitting the driving force to the first and second transmission shafts.

A stepping motor control method according to still another aspect of the present invention comprises a starting torque value obtaining step of obtaining a starting torque value corresponding to a drive stop time level indicating the duration of a time during which a stepping motor is not driven as a starting torque value required to start driving the stepping motor to be driven upon receiving an excitation current compatible with an excitation method for exciting a plurality of excitation coils; an excitation current value calculating step of calculating an excitation current value which gives the starting torque value obtained in the starting torque value obtaining step in the stepping motor as an excitation current value of the excitation current; and an excitation current outputting step of outputting an excitation current having the excitation current value obtained in the excitation current value calculating step to the stepping motor.

According to this embodiment, the starting torque value corresponding to the drive stop time level indicating the duration of the time during which the stepping motor is not driven is obtained in the starting torque value obtaining step and the excitation current value that gives the obtained starting torque value is calculated in the excitation current value calculating step. Then, the excitation current having the calculated excitation current value is output in the excitation current outputting step.

By this, an excitation current having an excitation current value which gives a large starting torque value is output when a time during which toner is not agitated by a driving force of the stepping motor continues and there is a possibility of toner adhesion. Therefore, it can be started to drive the stepping motor with a large starting torque when there is a possibility of toner adhesion.

The stepping motor generally does not require a feedback mechanism. In other words, the stepping motor is compatible with an open-loop control. Thus, no feedback mechanism is required, wherefore cost can be reduced.

This application is based on Japanese Patent Application Serial No. 2009-064709, filed in Japan Patent Office on Mar. 17, 2009, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A toner agitating stepping motor control unit used in combination with a stepping motor to be driven upon receiving the input of an excitation current compatible with an excitation method for exciting a plurality of excitation coils, comprising:

an excitation current output section for outputting the excitation current to the stepping motor;

a first level judging section for judging a drive stop time level indicating the duration of a time during which the stepping motor is not driven;

a storage storing a plurality of starting torque values required to start driving the stepping motor and a plurality of drive stop time levels while relating them to each other; and a controller for obtaining the starting torque value corresponding to the drive stop time level judged by the first level judging section by referring to the storage, calculating an excitation current value which gives the obtained starting torque value and outputting an excitation current having the calculated excitation current value.

2. A toner agitating stepping motor control unit according to claim 1, further comprising a pulse output section for outputting a step pulse used for the excitation current output section to output the excitation current; wherein:

the controller calculates an excitation current value which gives a constant-speed torque value predetermined to drive the stepping motor at a constant speed and smaller than the plurality of respective starting torque values when the frequency of the step pulse is a predetermined constant-speed frequency.

3. A toner agitating stepping motor control unit according to claim 1, wherein:

the toner agitating stepping motor control unit is arranged in an image forming apparatus for forming an image on a recording medium and further comprises an interior temperature level judging section for judging an interior temperature level indicating a level of the interior temperature of the image forming apparatus while the stepping motor is not driven;

the storage stores the plurality of respective starting torque values and a plurality of interior temperature levels while relating them to each other; and the controller obtains the starting torque value corresponding to the interior temperature level judged by the interior temperature level judging section by referring to the storage and calculates an excitation current value which gives the obtained starting torque value.

4. A toner agitating stepping motor control unit according to claim 1, wherein:

the toner agitating stepping motor control unit is arranged in an image forming apparatus for forming an image on a recording medium and further comprises an interior humidity level judging section for judging an interior humidity level indicating a level of the interior humidity of the image forming apparatus while the stepping motor is not driven;

the storage stores the plurality of respective starting torque values and a plurality of interior humidity levels while relating them to each other; and the controller obtains the starting torque value corresponding to the interior humidity level judged by the interior humidity level judging section by referring to the storage and calculates an excitation current value which gives the obtained starting torque value.

5. A toner agitating stepping motor control unit according to claim 1, wherein:

the toner agitating stepping motor control unit is arranged in an image forming apparatus for forming an image on a recording medium and further comprises an interior temperature level judging section for judging an interior temperature level indicating a level of the interior temperature of the image forming apparatus while the stepping motor is not driven and an interior humidity level judging section for judging an interior humidity level indicating a level of the interior humidity of the image forming apparatus while the stepping motor is not driven;

the storage stores the plurality of respective starting torque values and a plurality of combinations of the drive stop time level, the interior temperature level and the interior humidity level while relating them to each other; and the controller obtains the starting torque value corresponding to the combination of the drive stop time level judged by the first level judging section, the interior temperature level judged by the interior temperature level judging section and the interior humidity level judged by the interior humidity level judging section by referring to the storage and calculates an excitation current value which gives the obtained starting torque value.

6. A toner agitating stepping motor control unit according to claim 1, wherein:

the toner agitating stepping motor control unit is arranged in an image forming apparatus including a plurality of toner hoppers for containing toners of different colors and an agitating portion for agitating the toners contained in the plurality of respective toner hoppers and adapted to form an image on a recording medium and further comprises a second level judging section for judging an agitation stop time level indicating the duration of a time during which the toner is not agitated in each of the plurality of toner hoppers, an interior temperature level judging section for judging an interior temperature level indicating a level of the interior temperature of each of the plurality of toner hoppers in each of the plurality of toner hoppers while the toner is not agitated, and an interior humidity level judging section for judging an interior humidity level indicating a level of the interior humidity of each of the plurality of toner hoppers in each of the plurality of toner hoppers while the toner is not agitated;

the storage stores a plurality of individual hopper starting torques required for the stepping motor to agitate the toners contained in the plurality of respective toner hoppers and a plurality of combinations of the agitation stop time level, the interior temperature level and the interior humidity level for each of the plurality of toner hoppers while relating to each other; and the controller obtains the individual hopper starting torque values corresponding to the combination of the agitation stop time level judged by the second level judging section, the interior temperature level judged by the interior temperature level judging section and the interior humidity level judged by the interior humidity level judging section for each of the plurality of toner hoppers by referring to the storage and calculates an excitation current value which gives a starting torque value expressed by the total value of the obtained individual hopper starting torque values.

7. An image forming apparatus, comprising:

a toner agitating stepping motor control unit;

a stepping motor to be driven upon receiving an excitation current compatible with an excitation method for exciting a plurality of excitation coils;

a first toner hopper for containing black toner;

a plurality of second toner hoppers for containing different color toners;

a first agitating portion arranged in the first toner hopper for agitating the black toner by a driving force generated by driving the stepping motor;

a plurality of second agitating portions each arranged in the corresponding one of the plurality of second toner hoppers for agitating the color toner by a driving force generated by driving the stepping motor;

a first transmission shaft for transmitting the driving force to the first agitating portion;

a second transmission shaft for transmitting the driving force to the respective second agitating portions; and a transmission switching assembly for transmitting a driving force of the stepping motor in a reverse direction to the first and second transmission shafts while transmitting a driving force of the stepping motor in a forward direction to the first transmission shaft;

wherein the toner agitating stepping motor control unit includes:

an excitation current output section for outputting the excitation current to the stepping motor;

a first level judging section for judging a drive stop time level indicating the duration of a time during which the stepping motor is not driven;

a storage storing a plurality of starting torque values required to start driving the stepping motor and a plurality of drive stop time levels while relating them to each other; and a controller for obtaining the starting torque value corresponding to the drive stop time level judged by the first level judging section by referring to the storage, calculating an excitation current value which gives the obtained starting torque value and outputting an excitation current having the calculated excitation current value.

8. An image forming apparatus according to claim 7, wherein:

the toner agitating stepping motor control unit further includes a pulse output section for outputting a step pulse used for the excitation current output section to output the excitation current; and the controller calculates an excitation current value which gives a constant-speed torque value predetermined to drive the stepping motor at a constant speed and smaller than the plurality of respective starting torque values when the frequency of the step pulse is a predetermined constant-speed frequency.

9. An image forming apparatus according to claim 7, wherein:

the toner agitating stepping motor control unit further includes an interior temperature level judging section for judging an interior temperature level indicating a level of the interior temperature of the image forming apparatus while the stepping motor is not driven;

the storage stores the plurality of respective starting torque values and a plurality of interior temperature levels while relating them to each other; and the controller obtains the starting torque value corresponding to the interior temperature level judged by the interior temperature level judging section by referring to the storage and calculates an excitation current value which gives the obtained starting torque value.

10. An image forming apparatus according to claim 7, wherein:

the toner agitating stepping motor control unit further includes an interior humidity level judging section for judging an interior humidity level indicating a level of the interior humidity of the image forming apparatus while the stepping motor is not driven;

the storage stores the plurality of respective starting torque values and a plurality of interior humidity levels while relating them to each other; and the controller obtains the starting torque value corresponding to the interior humidity level judged by the interior humidity level judging section by referring to the storage and calculates an excitation current value which gives the obtained starting torque value.

11. An image forming apparatus according to claim 7, wherein:

the toner agitating stepping motor control unit further includes an interior temperature level judging section for judging an interior temperature level indicating a level of the interior temperature of the image forming apparatus while the stepping motor is not driven and an interior humidity level judging section for judging an interior humidity level indicating a level of the interior humidity of the image forming apparatus while the stepping motor is not driven;

the storage stores the plurality of respective starting torque values and a plurality of combinations of the drive stop time level, the interior temperature level and the interior humidity level while relating them to each other; and the controller obtains the starting torque value corresponding to the combination of the drive stop time level judged by the first level judging section, the interior temperature level judged by the interior temperature level judging section and the interior humidity level judged by the interior humidity level judging section by referring to the storage and calculates an excitation current value which gives the obtained starting torque value.

12. An image forming apparatus according to claim 7, further comprising:

a plurality of toner hoppers for containing toners of different colors; and an agitating portion for agitating the toners contained in the plurality of respective toner hoppers, wherein:

the toner agitating stepping motor control unit further includes:

a second level judging section for judging an agitation stop time level indicating the duration of a time during which the toner is not agitated in each of the plurality of toner hoppers, an interior temperature level judging section for judging an interior temperature level indicating a level of the interior temperature of each of the plurality of toner hoppers in each of the plurality of toner hoppers while the toner is not agitated, and an interior humidity level judging section for judging an interior humidity level indicating a level of the interior humidity of each of the plurality of toner hoppers in each of the plurality of toner hoppers while the toner is not agitated, the storage stores a plurality of individual hopper starting torques required for the stepping motor to agitate the toners contained in the plurality of respective toner hoppers and a plurality of combinations of the agitation stop time level, the interior temperature level and the interior humidity level for each of the plurality of toner hoppers while relating to each other; and the controller obtains individual hopper starting torque values corresponding to the combination of the agitation stop time level judged by the second level judging section, the interior temperature level judged by the interior temperature level judging section and the interior humidity level judged by the interior humidity level judging section for each of the plurality of toner hoppers by referring to the storage and calculates an excitation current value which gives a starting torque value expressed by the total value of the obtained individual hopper starting torque values.

13. An image forming apparatus according to claim 7, wherein the excitation current value of the excitation current output to the stepping motor to drive the stepping motor in the reverse direction is larger than that of the excitation current output to the stepping motor to drive the stepping motor in the forward direction.

14. A stepping motor control method, comprising:
- a starting torque value obtaining step of obtaining a starting torque value corresponding to a drive stop time level indicating the duration of a time during which a stepping motor is not driven as a starting torque value required to start driving the stepping motor to be driven upon receiving an excitation current compatible with an excitation method for exciting a plurality of excitation coils;
- an excitation current value calculating step of calculating an excitation current value which gives the starting torque value obtained in the starting torque value obtaining step in the stepping motor as an excitation current value of the excitation current; and
- an excitation current outputting step of outputting an excitation current having the excitation current value obtained in the excitation current value calculating step to the stepping motor.

\* \* \* \* \*